US008855604B2

(12) United States Patent
Hwang

(10) Patent No.: US 8,855,604 B2
(45) Date of Patent: Oct. 7, 2014

(54) ROAMING AUTHENTICATION METHOD FOR A GSM SYSTEM

(71) Applicant: National Cheng Kung University, Tainan (TW)

(72) Inventor: Tzone-Lih Hwang, Tainan (TW)

(73) Assignee: National Cheng Kung University, Tainan (TW)

( * ) Notice: Subject to any disclaimer, the term of this patent is extended or adjusted under 35 U.S.C. 154(b) by 80 days.

(21) Appl. No.: 13/734,235

(22) Filed: Jan. 4, 2013

(65) Prior Publication Data

US 2013/0178191 A1 Jul. 11, 2013

(30) Foreign Application Priority Data

Jan. 6, 2012 (TW) .............................. 101100670 A
Jan. 6, 2012 (TW) .............................. 101100672 A
Jan. 6, 2012 (TW) .............................. 101100673 A

(51) Int. Cl.
*H04M 1/66* (2006.01)
*H04L 9/32* (2006.01)
*H04W 12/06* (2009.01)

(52) U.S. Cl.
CPC .................................... *H04W 12/06* (2013.01)
USPC .......................................... 455/411; 713/168

(58) Field of Classification Search
CPC ....................................................... H04W 12/06
USPC .......................................... 455/411; 713/168
See application file for complete search history.

(56) References Cited

U.S. PATENT DOCUMENTS

| 6,584,310 | B1 | 6/2003 | Berenzweig | |
|---|---|---|---|---|
| 7,539,309 | B2 | 5/2009 | Stadelmann et al. | |
| 8,005,460 | B2 | 8/2011 | Chen et al. | |
| 2002/0168960 | A1* | 11/2002 | Jacobson et al. | 455/410 |
| 2005/0177733 | A1* | 8/2005 | Stadelmann et al. | 713/185 |
| 2007/0180242 | A1 | 8/2007 | Nagaraj et al. | |
| 2013/0095797 | A1* | 4/2013 | Paz et al. | 455/411 |

* cited by examiner

*Primary Examiner* — Opiribo Georgewill
(74) *Attorney, Agent, or Firm* — Muncy, Geissler, Olds & Lowe, P.C.

(57) ABSTRACT

A roaming authentication method for a GSM system is disclosed. The method sends an IMSI of a user end to a visitor end, generates a challenge code, and sends the IMSI and the challenge code to a home end. The method further generates a random code, a signature code and a communication key and combines them into an authentication data. The method further generates and sends a response code to the visitor end. The user end generates and sends the authentication signature code to the visitor end for authentication purposes. In another embodiment, the visitor end sends one more challenge code to the home end. The home end generates an authentication key that is stored in the visitor end and used to generate an authentication code. The authentication code is sent to the use end which generates and sends an authentication signature code to the visitor end for authentication purposes.

25 Claims, 20 Drawing Sheets

ROAMING AUTHENTICATION METHOD FOR A GSM SYSTEM

BACKGROUND OF THE INVENTION

1. Field of the Invention

The present invention generally relates to an authentication method for a GSM system and, more particularly, to a roaming authentication method for a GSM system that is able to provide a secure authentication mechanism when executed via a public channel.

2. Description of the Related Art

As compared to the conventional communication systems with analogous modulations, Global System for Mobile Communication (GSM) is able to transmit digital data and provide a larger amount of services along with higher security due to the adoption of digital modulation, identification authentication, message encryption, etc. Thus, GSM system has been adopted worldwide.

FIG. 1 shows a block diagram of a conventional GSM system 8 which comprises a user end 81 (i.e. a mobile station), a visitor end 82 (i.e. a visitor location register, VLR) and a home end 83 (i.e. a home location register, HLR). The visitor end 82 is coupled between the user end 81 and the home end 83. In the conventional GSM system 8 above, it is assumed that the data channel between the visitor end 82 and the home end 83 is secure (i.e. a secure channel SC), and the visitor end 82 and the home end 83 have a reliable data transmission system with each other.

In the above configuration, it is required to perform a conventional roaming authentication process when the user end 81 requests a roaming service from the visitor end 82. In the roaming authentication process, the user end 81 requests the roaming service from the visitor end 82. The visitor end 82 then obtains authentication data from the home end 83 (which consists of a plurality of sets of {RAND,SRES,Kc} data) and selects a random code RAND from the authentication data. The random code RAND is sent to the user end 81 which, in turn, correspondingly generates an authentication signature code SRES'. The authentication signature code SRES' is sent to the visitor end 82 for authentication purposes. Based on this, the visitor end 82 is able to authenticate the user end 81 and to provide the user end 81 with required roaming service if the authentication result is positive.

The data transmitted between the visitor end 82 and the home end 83 (such as the authentication data) is in the form of cleartext, and it requires that the visitor end 82 and the home end 83 have a reliable data transmission system with each other. However, the data channel between the visitor end 82 and the home end 83 may not be secure (namely, the visitor end 82 and the home end 83 do not have a reliable data transmission system with each other) if the user end 81, the visitor end 82 and the home end 83 transmit data to each other via public channels. As a result, the conventional roaming authentication method is usually not performed through public channels where data interruption or interception is possible.

As stated above, the conventional roaming authentication method requires that the data channel between the visitor end 82 and the home end 83 is secure. However, this is not possible when data is transmitted between different communication systems. Moreover, the larger distance the data is transmitted the larger possibility the data experiences interruption or interception. Therefore, the visitor end 82 authenticates the home end 83 in a secure manner only when the communication systems are the same and the transmission distance is short. Disadvantageously, the conventional roaming authentication method cannot provide high security when the communication systems are different and the transmission distance is long. Thus, the use of the conventional roaming authentication method is limited.

Furthermore, since the calculation capability of the user end 81 is limited, it is required to reduce the amount of tasks of the user end 81 to improve the conventional roaming authentication method.

In conclusion, since the conventional roaming authentication method has a limited use and requires that the data channel between the visitor end 82 and the home end 83 is secure, it is inflexible and inconvenient to use the conventional roaming authentication method. As such, it is necessary to improve the conventional roaming authentication method for the above GSM system 8.

Furthermore, FIG. 2 shows a block diagram of another conventional GSM system 9 which comprises a user end 91, a new visitor end 92a (i.e. a new visitor location register, VLR), an old visitor end 92b (i.e. an old visitor location register, VLR) and a home end 93 (i.e. a home location register, HLR). The new visitor end 92a is coupled between the user end 91 and the old visitor end 92b. The home end 93 is coupled to the old visitor end 92b. In the conventional GSM system 9 above, it is assumed that the data channel between the new visitor end 92a and the old visitor end 92b is secure (i.e. a secure channel SC), as well as that the data channel between the old visitor end 92b and the home end 93 is secure (i.e. a secure channel SC). It is also assumed that the new visitor end 92a and the old visitor end 92b have a reliable data transmission system with each other.

In the above configuration, it is required to perform a conventional roaming authentication process when the user end 91 moves from the signal range of the old visitor end 92b to that of the new visitor end 92a. In the case scenario, the user end 91 switches to request the roaming service from the new visitor end 92a instead of the old visitor end 92b. In this regard, the user end 91 requests the roaming service from the new visitor end 92a. The new visitor end 92a then acquires authentication data from the old visitor end 92b (which consists of a plurality of sets of {RAND,SRES,Kc} data) and selects a random code RAND from the authentication data. The random code RAND is sent to the user end 91 which, in turn, correspondingly generates an authentication signature code SRES'. The authentication signature code SRES' is sent to the new visitor end 92a for authentication purposes. Based on this, the new visitor end 92a is able to authenticate the user end 91 and to provide the user end 91 with required roaming service if the authentication result is positive.

The data transmitted between the new visitor end 92a and the old visitor end 92b (such as the authentication data) is in the form of cleartext, and it requires that the new visitor end 92a and the old visitor end 92b have a reliable data transmission system with each other. However, the data channel between the new visitor end 92a and the old visitor end 92b may not be secure (namely, the new visitor end 92a and the old visitor end 92b do not have a reliable data transmission system with each other) if the user end 91, the new visitor end 92a and the old visitor end 92b transmit data to each other via public channels. As a result, the conventional roaming authentication method is usually not performed through public channels where data interruption or interception is possible.

As stated above, the conventional roaming authentication method requires that the data channel between the new visitor end 92a and the old visitor end 92b is secure. However, this is not possible when data is transmitted between different communication systems. Moreover, the larger distance the data is transmitted the larger possibility the data experiences interruption or interception. Therefore, the new visitor end 92a authenticates the old visitor end 92b in a secure manner only when the communication systems are the same and the transmission distance is short. Disadvantageously, the conventional roaming authentication method cannot provide high security when the communication systems are different and the transmission distance is long. Thus, the use of the conventional roaming authentication method is limited.

In conclusion, since the conventional roaming authentication method has a limited use and requires that the data channel between the new visitor end 92a and the old visitor end 92b is secure, it is inflexible and inconvenient to use the conventional roaming authentication method. As such, it is also necessary to improve the conventional roaming authentication method for the above GSM system 9.

SUMMARY OF THE INVENTION

It is therefore the objective of this invention to provide a roaming authentication method for a GSM system that is able to provide a secure authentication mechanism when executed via a public channel due to the arrangement of a shared key shared between a visitor end and a home end for data verification purposes.

It is another objective of this invention to provide a roaming authentication method for GSM system that is able to provide a secure authentication mechanism between different communication systems due to the arrangement of the shared key shared between the visitor end and the home end for data verification purposes.

It is yet another objective of this invention to provide a roaming authentication method for GSM system that is able to provide a secure authentication mechanism when executed via a public channel due to the arrangement of a shared key shared between a visitor end and a home end for data verification purposes.

In an embodiment, a roaming authentication method for a GSM system is disclosed. The method comprises sending an international mobile subscriber identity of a user end to a visitor end to request a roaming service from the visitor end, as performed by the user end in a request procedure. The method further comprises generating a challenge code and sending the challenge code and the international mobile subscriber identity to a home end, as performed by the visitor end in an inquiry procedure. The method further comprises determining whether the international mobile subscriber identity is correct and generating a random code, generating a signature code and a communication key based on the random code and a ciphering key, combining the random code, the signature code and the communication key as an authentication data, generating a response code using the challenge code, the authentication data and a shared key, and sending the response code to the visitor end, as performed by the home end in a response procedure. The method further comprises verifying the response code using the shared key and sending the random code to the user end, as performed by the visitor end in a notification procedure. The method further comprises generating an authentication signature code based on the ciphering key and the random code and sending the authentication signature code to the visitor end for the visitor end to authenticate the user end, as performed by the user end in an authentication procedure.

In a preferred form shown, the challenge code is a numerical number generated in a random manner, a timestamp specifying time information, or a selected number obtained from a series of numbers with even or odd increments or decrements.

In the preferred form shown, the method further comprises determining whether the challenge code contained in the response code is consistent with the challenge code previously transmitted to the home end by the visitor end, as performed by the visitor end.

In the preferred form shown, the method further comprises storing the authentication data in the visitor end in the notification procedure if the challenge code contained in the response code is consistent with the challenge code previously transmitted to the home end by the visitor end.

In the preferred form shown, the method further comprises generating the authentication signature code by performing an operation on the ciphering key and the random code based on a first hash function, as performed by the user end in the authentication procedure.

In the preferred form shown, the method further comprises generating the signature code by performing an operation on the random code and the ciphering key based on a first hash function, as performed by the home end in the response procedure.

In the preferred form shown, the method further comprises generating the communication key by performing an operation on the random code and the ciphering key based on a second hash function, as performed by the home end in the response procedure.

In the preferred form shown, the method further comprises selecting the random code from a series of random codes in sequence, as performed by the visitor end in the notification procedure.

In the preferred form shown, the method further comprises generating a secondary signature code and a secondary communication key based on the random code and the ciphering key, and combining the random code, the signature code, the communication key, the secondary signature code and the secondary communication key as the authentication data, as performed by the home end in the response procedure. The method further comprises a re-authentication procedure generating a secondary authentication signature code by performing a remaining number of times of operation on the ciphering key and the random code, and sending the secondary authentication signature code to the visitor end, as performed by the user end when requesting the roaming service from the visitor end again. The method further comprises performs the remaining number of times of operation on the secondary signature code to verify the secondary authentication signature code for the visitor end to authenticate the user end, as performed by the visitor end in the notification procedure. The remaining number of times is a difference between a predetermined number of times and a number of times that the user end has requested the roaming service from the visitor end.

In the preferred form shown, the method further comprises generating the secondary signature code by performing an operation on the random code and the ciphering key based on a first hash function, as performed by the home end in the response procedure.

In the preferred form shown, the method further comprises generating the secondary communication key by performing an operation on the random code and the ciphering key based on a second hash function, as performed by the home end in the response procedure.

In another embodiment, a roaming authentication method for a GSM system is disclosed. The method comprises generating a first challenge code and sending the first challenge code and an international mobile subscriber identity of a user end to a visitor end to request a roaming service from the visitor end, as performed by the user end in a request procedure. The method further comprises generating a second challenge code and sending the first challenge code, the second challenge code and the international mobile subscriber identity to a home end, as performed by the visitor end in an inquiry procedure. The method further comprises determining whether the international mobile subscriber identity is correct, generating an authentication key and a random code, generating a signature code and a communication key based on the random code and a ciphering key, combining the random code, the signature code and the communication key as an authentication data, generating a response code using the second challenge code, the authentication data, the authentication key and a shared key, and sending the response code to the visitor end, as performed by the home end in a response procedure. The method further comprises verifying the response code using the shared key, generating an authentication code using the first challenge code and the authentication key, and sending the authentication code and the random code to the user end, as performed by the visitor end in a notification procedure. The method further comprises generating another authentication key to determine whether the authentication code is correct, generating an authentication signature code based on the ciphering key and the random code, and sending the authentication signature code to the visitor end for the visitor end to authenticate the user end, as performed by the user end in an authentication procedure.

In another preferred form shown, the method further comprises generating a secondary signature code and a secondary communication key based on the random code and the ciphering key, and combining the random code, the signature code, the communication key, the secondary signature code and the secondary communication key as the authentication data, as performed by the home end in the response procedure. The method further comprises a re-authentication procedure generating a secondary authentication signature code by performing a remaining number of times of operation on the ciphering key and the random code, and sending the secondary authentication signature code to the visitor end, as performed by the user end when requesting the roaming service from the visitor end again. The method further performs the remaining number of times of operation on the secondary signature code to verify the secondary authentication signature code for the visitor end to authenticate the user end, as performed by the visitor end in the notification procedure. The remaining number of times is a difference between a predetermined number of times and a number of times that the user end has requested the roaming service from the visitor end.

In the preferred form shown, the method further comprises generating the secondary signature code by performing an operation on the random code and the ciphering key based on a first hash function, as performed by the home end in the response procedure.

In the preferred form shown, the method further comprises generating the secondary communication key by performing an operation on the random code and the ciphering key based on a second hash function, as performed by the home end in the response procedure.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
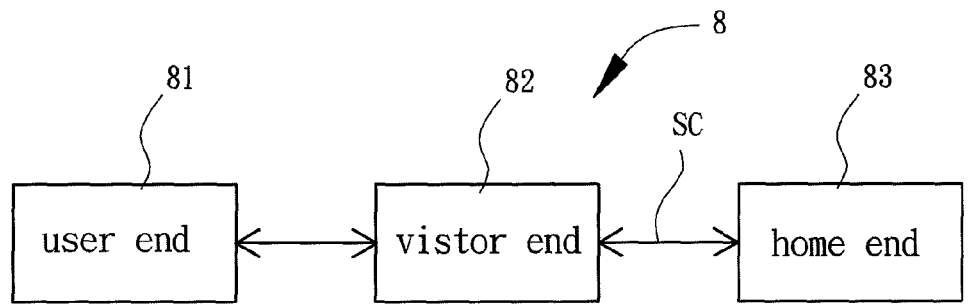
FIG. 1 shows a block diagram of a conventional GSM system.
Figure 2:
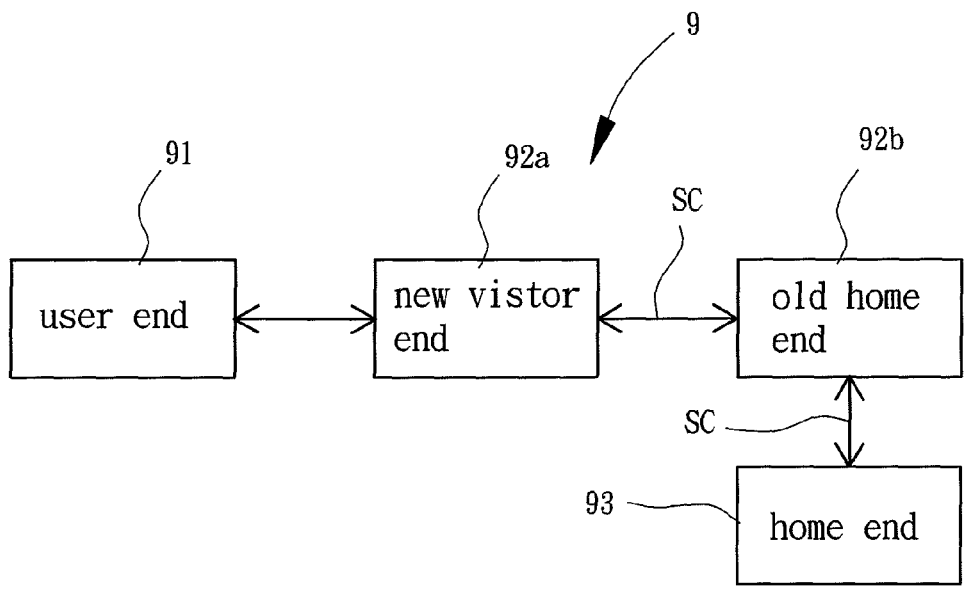
FIG. 2 shows a block diagram of another conventional GSM system.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 3:
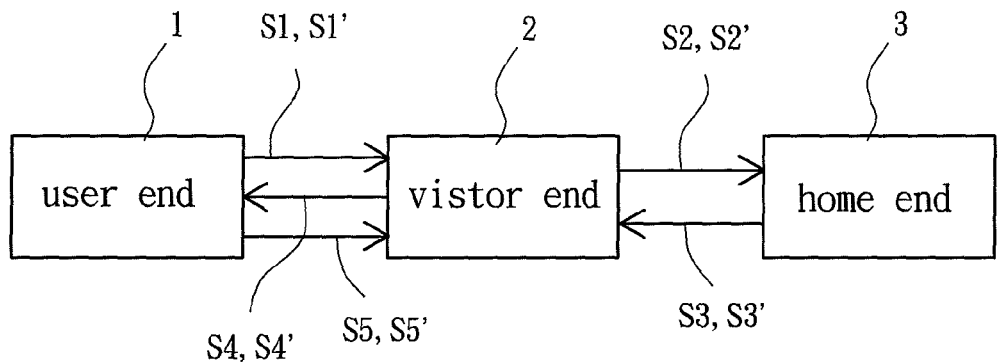
FIG. 3 shows a block diagram of a GSM system for executing a proposed roaming authentication method according to first and second embodiments of the invention.

FIG. 3 shows a block diagram of a GSM system for executing a roaming authentication method as proposed in first and second embodiments of the invention. The GSM system comprises a user end 1 (i.e. a mobile station), a visitor end 2 (i.e. a visitor location register, VLR) and a home end 3 (i.e. a home location register, HLR). The configurations of the user end 1, the visitor end 2 and the home end 3 are not described herein, as it can be readily appreciated by one having ordinary skill in the art.

It is noted that the term "ciphering key" referred hereinafter is a key shared between the user end 1 and the home end 3 for the purposes of data encryption and decryption, as it can be readily appreciated by one having ordinary skill in the art.

It is noted that the term "shared key" referred hereinafter is a key shared between the visitor end 2 and the home end 3 for the purposes of data encryption and decryption, as it can be readily appreciated by one having ordinary skill in the art.

It is noted that the term "authentication key" referred hereinafter is a key that both the user end 1 and the home end 3 are able to generate by themselves for the authentication purpose of the user end 1, as it can be readily appreciated by one having ordinary skill in the art.

Figure 4:
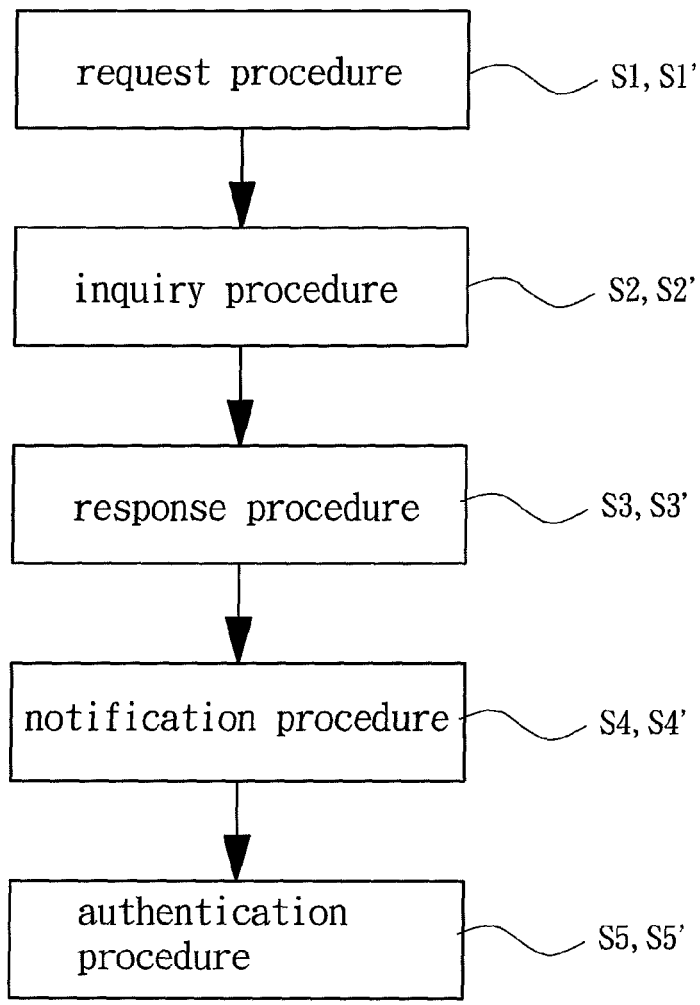
FIG. 4 shows a flowchart of the proposed roaming authentication method of the first and second embodiments of the invention.
Figure 5A:
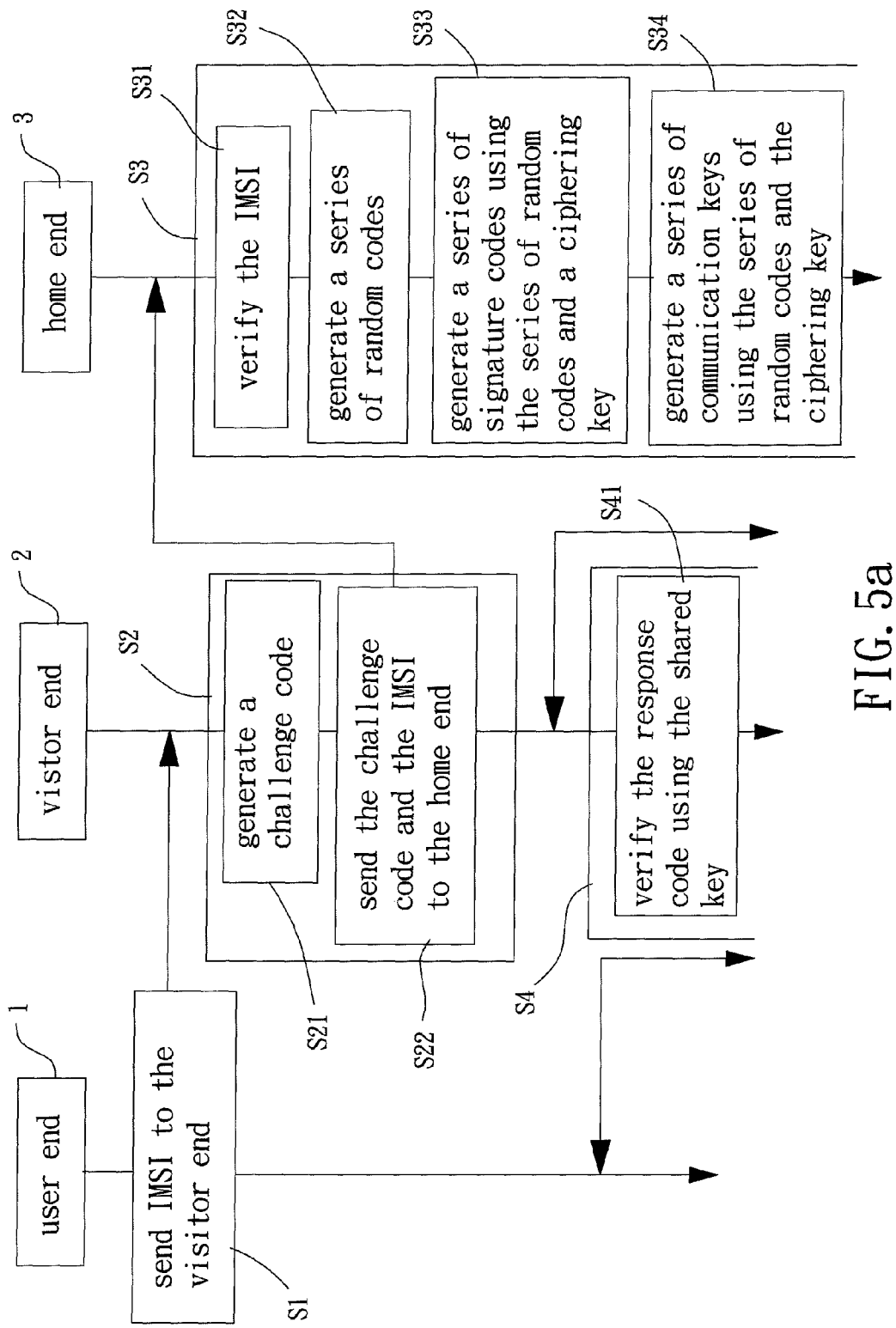
FIGS. 5a and 5b show the detailed procedures of the roaming authentication method according to the first embodiment of the invention.
Figure 5B:
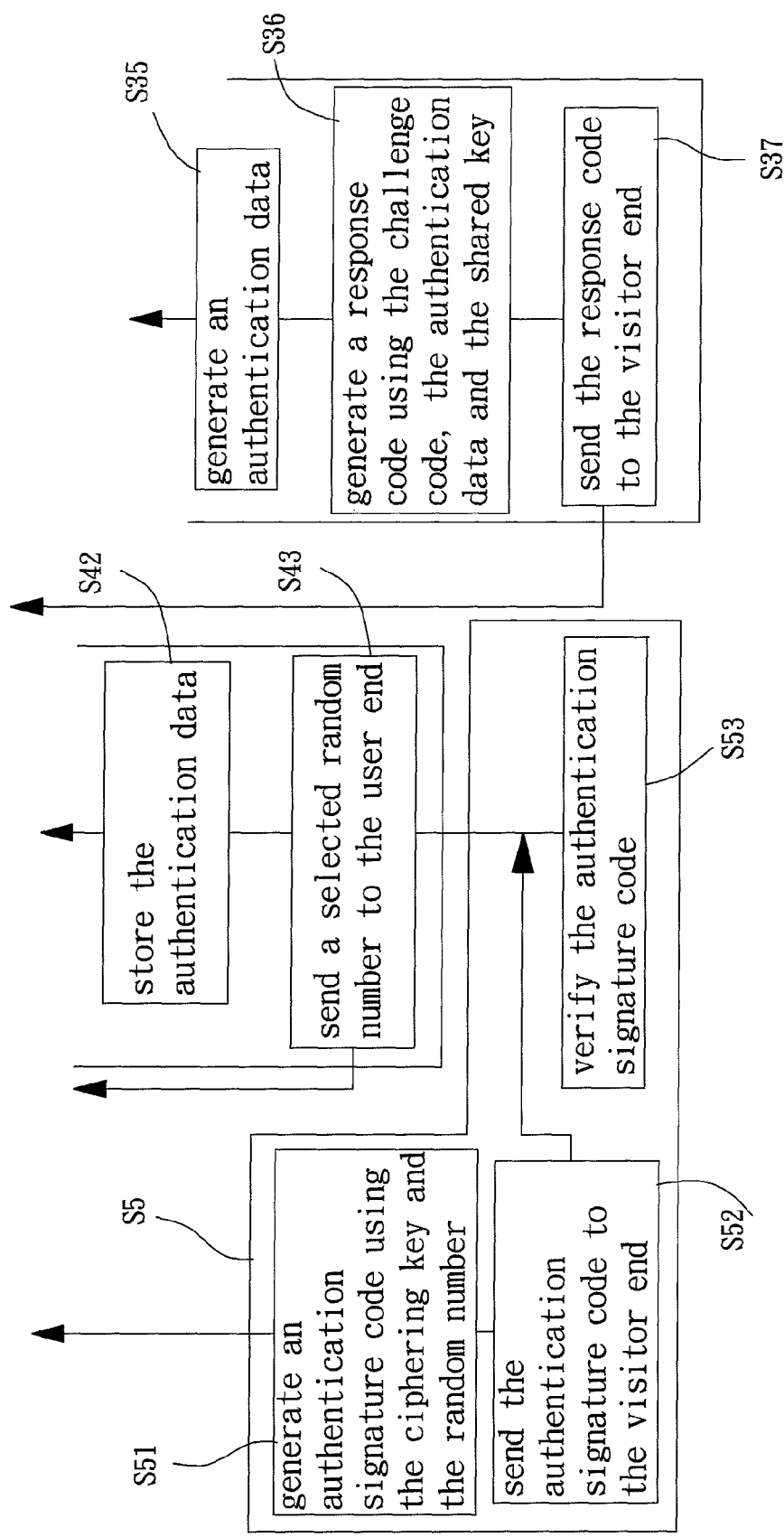

FIG. 4 shows a flowchart of the roaming authentication method proposed in the first and second embodiments of the invention. FIGS. 5a and 5b show the detailed procedures of the roaming authentication method according to the first embodiment of the invention. The roaming authentication method comprises a request procedure S1, an inquiry procedure S2, a response procedure S3, a notification procedure S4 and an authentication procedure S5.

In the request procedure S1, the user end 1 transmits its international mobile subscriber identity (IMSI) to the visitor end 2 for requesting a roaming service from the visitor end 2. The IMSI (such as 466-920-xxxxxxxxx) is stored in both the user end 1 and the home end 3 when the user end 1 registered at the home end 3. The user end 1 may request the roaming service from the visitor end 2 when moving into the signal range of the visitor end 2. At the time the user end 1 initially moves into the signal range of the visitor end 2, the visitor end 2 is unable to authenticate the user end 1 due to the lack of the authentication data required. In this regard, the visitor end 2 must request the required data from the home end 3 for authentication purpose of the user end 1. The visitor end 2 provides the user end 1 with requested roaming service if the authentication result of the user end 1 is positive.

In the inquiry procedure S2, the visitor end 2 generates a challenge code. The visitor end 2 transmits the challenge code and the IMSI to the home end 3. The inquiry procedure S2 consists of a first step S21 and a second step S22 performed by the visitor end 2, as elaborated below.

In the first step S21, the visitor end 2 receives the IMSI and generates the challenge code. Specifically, when the visitor end 2 receives the IMSI from the user end 1, the visitor end 2 realizes that the user end 1 is requesting for roaming service from the visitor end 2. At the time, the visitor end 2 stores the IMSI and acquires the associated data from the home end 3 that is required for authentication purpose of the user end 1. To ensure that the acquired data is valid, the visitor end 2 generates and stores the challenge code. The challenge codes are of numerical numbers that are randomly generated. Each challenge code is different from others and is used once only. The challenge codes may also be in the form of a plurality of timestamps specifying exact time information, or a series of numbers with even or odd increments or decrements.

In the second step S22, the visitor end 2 transmits the challenge code and the IMSI to the home end 3. Specifically, since both the user end 1 and the home end 3 have the IMSI, the visitor end 2 is able to acquire the associated data from the home end 3 (required for authentication purpose of the user end 1) based on the IMSI. The acquired data is deemed valid if the home end 3 successfully and correctly sends the challenge code (or the corresponding value of the challenge code) back to the visitor end 2, as elaborated below.

In the response procedure S3, the home end 3 determines whether the IMSI is correct and generates a series of random codes, generates a series of signature codes and a series of communication keys based on the series of random codes and a ciphering key (shared between the user end 1 and the home end 3), combines the series of random codes, the series of signature codes and the series of communication keys as an authentication data, generates a response code using the challenge code, the authentication data and a shared key (shared between the visitor end 2 and the home end 3), and sends the response code to the visitor end 2. The response procedure S3 consists of a first step S31, a second step S32, a third step S33, a fourth step S34, a fifth step S35, a sixth step S36 and a seventh step S37 performed by the home end 3, as elaborated below.

In the first step S31, the home end 3 receives the IMSI and determines whether the IMSI is correct. Specifically, since the home end 3 and the user end 1 have the same IMSI, the home end 3 is able to compare the stored IMSI with the IMSI received from the visitor end 2. If the comparison is consistent (namely, the IMSI stored in the home end 3 is the same as the IMSI received from the visitor end 2), the second step S32 is performed. If the comparison is inconsistent, the following steps are not performed.

In the second step S32, the home end 3 generates the series of random codes. The series of random codes consists of a plurality of random codes, such as $r_0, r_1, \ldots, r_m$ (m+1 random codes). The series of random codes is of a plurality of numbers that is generated in a random manner without repetition. Every random code is different from others and is used once only.

In the third step S33, the home end 3 generates the series of signature codes using the series of random codes and the ciphering key. The ciphering key was already stored in the user end 1 and the home end 3. The home end 3 is able to generate the series of signature codes based on the series of random codes and the ciphering key for authentication purposes of the user end 1. The series of signature codes is generated according to the following formula:

$$s_{0,\ldots,m} = H(K_{31}, r_{0,\ldots,m}), \quad (1)$$

wherein $s_{0,\ldots,m}$ is the series of signature codes which consists of a plurality of signature codes, such as $s_0, s_1, \ldots, s_m$ (m+1 signature codes). $K_{31}$ is the ciphering key shared between the home end 3 and the user end 1. The symbol $r_0, r_1, \ldots, r_m$ is the series of random codes. H is the one-way hash function (namely, the first hash function), such as the A3 one-way hash function. In the fourth step S34, the home end 3 generates the series of communication keys based on the series of random codes and the ciphering key for authentication purposes of the user end 1. The series of communication keys is generated according to the following formula:

$$k_{0,\ldots,m} = F(K_{31}, r_{0,\ldots,m}), \quad (2)$$

wherein $k_{0,\ldots,m}$ is the series of communication keys which consists of a plurality of communication keys, such as $k_0, k_1, \ldots, k_m$ (m+1 communication keys). F is the one-way hash function (namely, the second hash function), such as the A8 one-way hash function.

In the fifth step S35, the home end 3 combines the series of random codes, the series of signature codes and the series of communication keys as the authentication data for authentication purposes of the user end 1. The authentication data has the following format:

$$B = (r_{0,\ldots,m}, s_{0,\ldots,m}, k_{0,\ldots,m}). \quad (3)$$

In the sixth step S36, the home end 3 generates the response code using the challenge code, the authentication data and the shared key.

Specifically, the shared key can be used to encrypt or decrypt data for improved security. In other words, the data transmitted from the home end 3 to the visitor end 2 can be protected from malicious invasions, such as data interruption or interception. Optionally, the home end 3 can choose to send the challenge code or its corresponding value to the visitor end 2 for the visitor end 2 to identify the identity of home end 3. The corresponding value of the challenge code may be the binary complement of the challenge code. In this embodiment, the home end 3 chooses to send the challenge code to the visitor end 2. Thus, the home end 3 generates the response code by encrypting the challenge code and the authentication data using the shared key. The response code may be generated in a conventional manner below:

$$C = E_{K_{23}}(N, B), \qquad (4)$$

wherein C is the response code, E is an encryption function such as DES or 3DES asymmetric encryption algorithm, $K_{23}$ is the shared key shared between the home end 3 and the visitor end 2, and N is the challenge code or its corresponding value.

In the seventh step S37, the home end 3 sends the response code to the visitor end 2 via a public channel.

In the notification procedure S4, the visitor end 2 verifies the response code using the shared key, selects one random code from the series of random codes, and sends the selected random code to the user end 1. The notification procedure S4 consists of a first step S41, a second step S42 and a third step S43.

In the first step S41, the visitor end 2 receives the response code and verifies the response code using the shared key. Specifically, since the visitor end 2 and the home end 3 share the shared key, the visitor end 2 is able to decrypt the response code using the shared key. The decryption principle of the response code is not described herein as it is performed in a manner corresponding to the encryption manner of the home end 3. Based on the decrypted data, the visitor end 2 is able to determine whether the received response code contains the challenge code previously transmitted to the home end 3 by the visitor end 2 (or contains the corresponding value of the challenge code). In other words, it can be determined whether the challenge code contained in the received response code is consistent with the one previously transmitted to the home end 3 by the visitor end 2. If the determination result is positive, the visitor end 2 stores the authentication data. If the determination result is negative, the following steps are not performed. In this manner, it can be determined whether the response code is provided by an authentic home end 3.

In the second step S42, the visitor end 2 stores the authentication data. Since the series of random codes, the series of signature codes and the series of communication keys contained in the authentication data are of high importance for authentication purposes of the user end 1, the authentication data has to be stored in the visitor end 2.

In the third step S43, the visitor end 2 selects one random code from the series of random codes and sends the selected random code to the user end 1. If the selected random code has already been selected before, then that random code is not selected again. In other words, every random code is not repeatedly selected. As an example, the first random code $r_0$ is selected for first time authentication purposes, and the remaining random codes $r_{1, 2, \ldots, m}$ are selected in sequence for future authentication operations. After the visitor end 2 records the selected random code, the visitor end 2 sends the selected random code to the user end 1. Accordingly, the user end 1 can be authenticated based on whether the user end 1 sends a correct signature code corresponding to the selected random code to the visitor end 2.

In the authentication procedure S5, the user end 1 generates an authentication signature code based on the ciphering key and the received random code, and sends the authentication signature code to the visitor end 2 for authentication purpose. If the authentication result is positive, the visitor end 2 provides the user end 1 with requested roaming service. The authentication procedure S5 consists of a first step S51 and a second step S52 performed by the user end 1, as well as a third step S53 performed by the visitor end 2.

In the first step S51, the user end 1 receives the random code from the visitor end 2 and generates the authentication signature code by performing an operation on the random code and the ciphering key based on the first hash function (such as the A3 one-way hash function). Specifically, due to the facts that the user end 1 and the home end 3 share the ciphering key and that the user end 1 has the ability to generate the signature code (using the A3 one-way hash function), the user end 1 can generate the authentication signature code based on the random code and the ciphering key.

In the second step S52, the user end 1 sends the authentication signature code to the visitor end 2. Since the user end 1 generates the authentication signature code in a manner similar to that of the signature code of the home end 3, the authentication signature code can be used by the visitor end 2 to determine whether the user end 1 is authentic or not.

In the second step S53, the visitor end 2 verifies the authentication signature code. Specifically, since the visitor end 2 has the authentication data and knows which random code was previously sent to the user end 1 (such as $r_0$), the visitor end 2 is able to find out the corresponding signature code from the authentication data (such as $s_0$) and compares the signature code (such as $s_0$) with the authentication signature code received from the user end 1. If the comparison result is consistent, the user end 1 passes the authentication and will be provided with requested roaming service.

In conclusion, the roaming authentication method in the first embodiment of the invention provides a one-way authentication mechanism in which both the visitor end 2 and the home end 3 can verify the data based on the shared key shared therebetween. As such, it is possible to transmit data through a public channel or over a long distance with high security. It is also possible to transmit data between different communication systems with high security. Thus, data interruption and interception can be prevented.

Figure 6A:
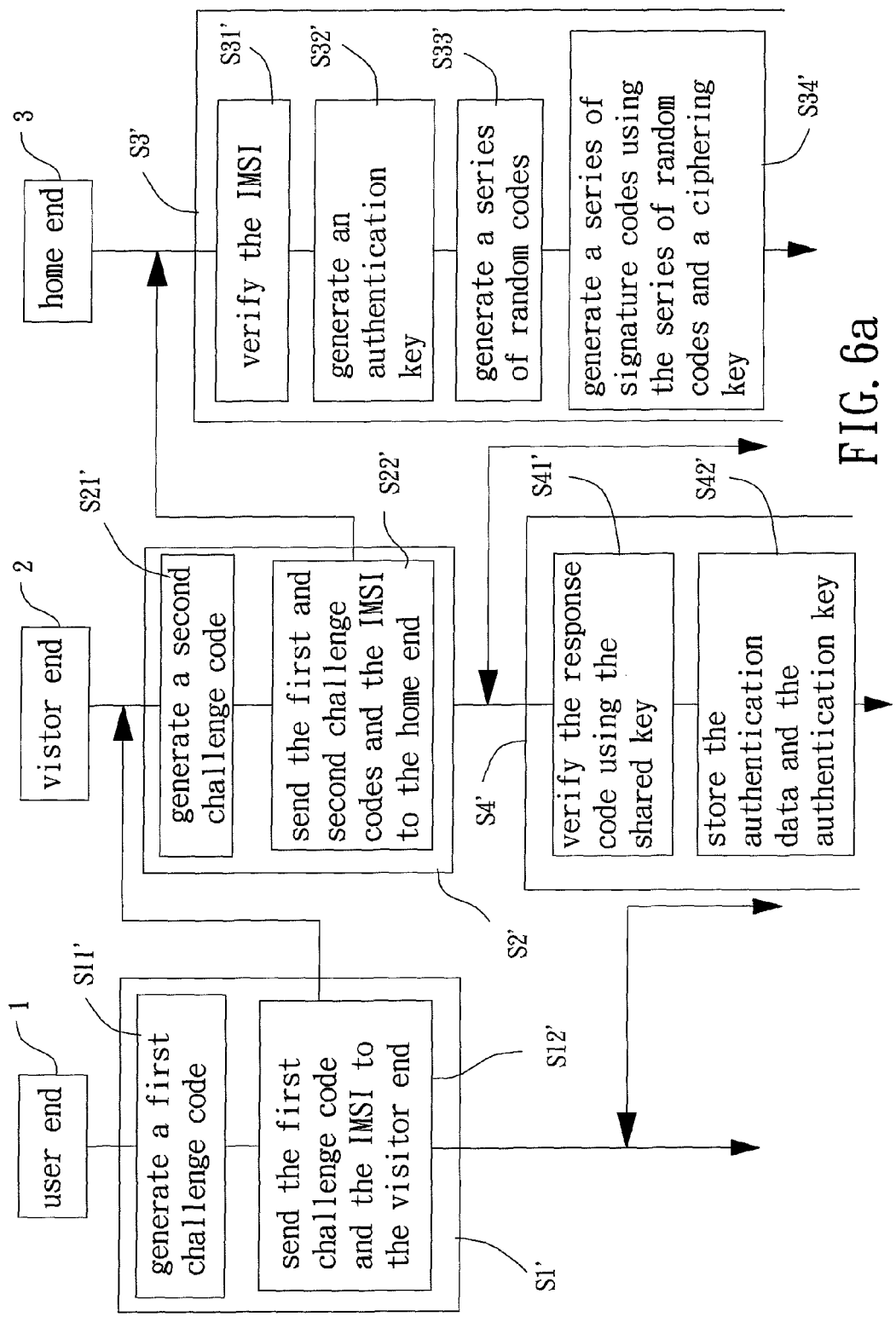
FIGS. 6a and 6b show the detailed procedures of the roaming authentication method according to the second embodiment of the invention.
Figure 6B:
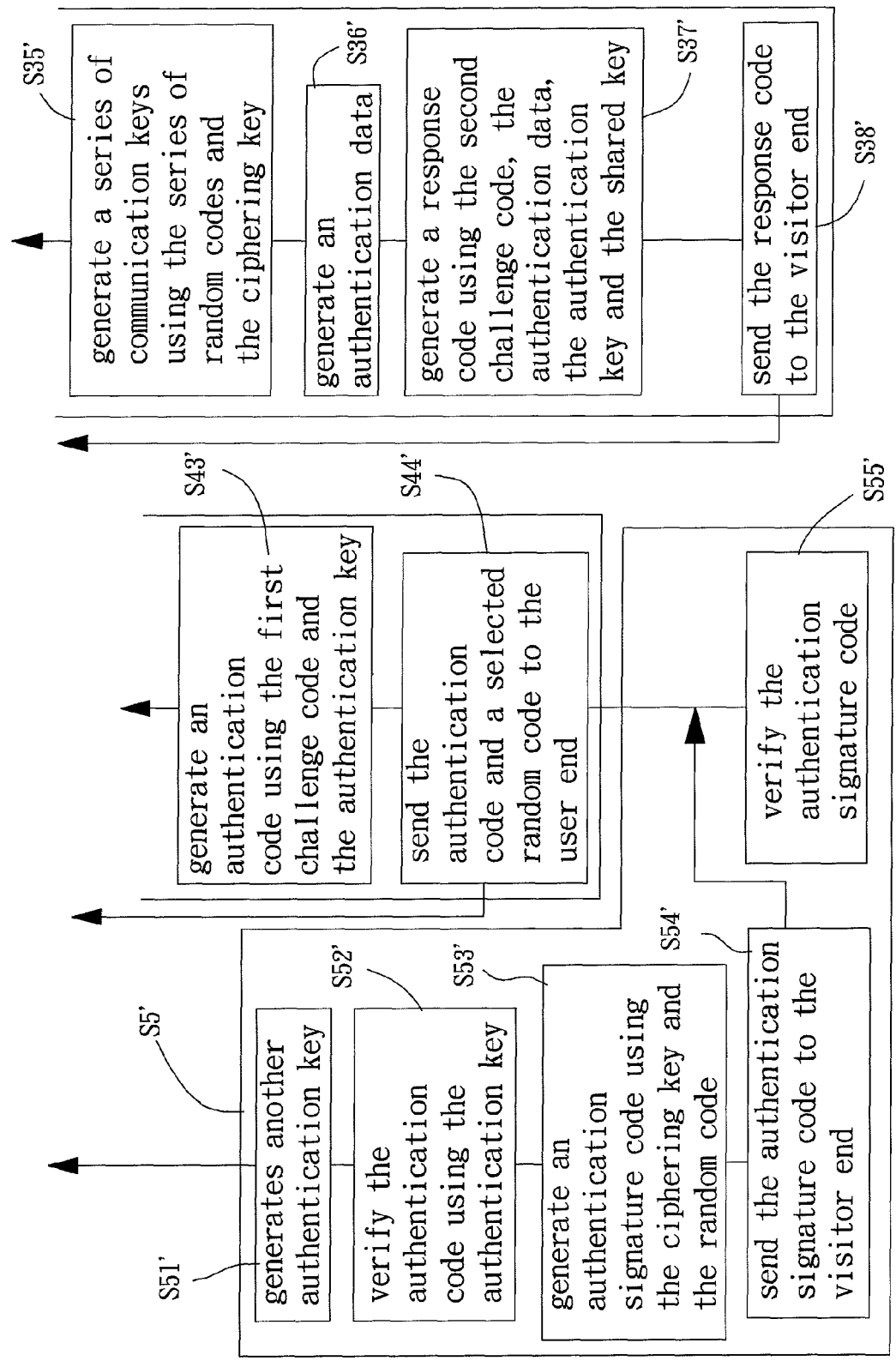

FIGS. 6*a* and 6*b* show the detailed procedures of the roaming authentication method according to the second embodiment of the invention. The roaming authentication method in the second embodiment provides a two-way authentication mechanism and comprises a request procedure S1', an inquiry procedure S2', a response procedure S3', a notification procedure S4' and an authentication procedure S5'.

The request procedure S1' consists of a first step S11' and a second step S12'. In the first step S11', the user end 1 generates a first challenge code. In the second step S12', the user end 1 sends the first challenge code and the IMSI to the visitor end 2, requesting a roaming service from the visitor end 2. The first challenge code serves the purpose of identifying the identity of the visitor end 2 and is generated in a manner similar to that of the challenge code described in the first embodiment above.

The inquiry procedure S2' comprises a first step S21' and a second step S22'. In the first step S21', the visitor end 2 generates a second challenge code. In the second step S22', the visitor end 2 sends the first and second challenge codes and the IMSI to the home end 3. The second challenge code is similar to the challenge code in the first embodiment and therefore is not described herein again.

The response procedure S3' comprises a first step S31', a second step S32', a third step S33', a fourth step S34', a fifth step S35', a sixth step S36', a seventh step S37' and an eighth step S38'. In the first step S31', the home end 3 verifies the IMSI. In the second step S32', the home end 3 generates an authentication key. In the third step S33', the home end 3 generates a series of random codes. In the fourth step S34', the home end 3 generates a series of signature codes based on the series of random codes and the ciphering key. In the fifth step S35', the home end 3 generates a series of communication keys based on the series of random codes and the ciphering key. In the sixth step S36', the home end 3 combines the series of random codes, the series of signature codes and the series of communication keys as an authentication data. In the seventh step S37', the home end 3 generates a response code using the second challenge code, the authentication data, the authentication key and the shared key. In the eighth step S38', the home end 3 sends the response code to the visitor end 2. The authentication key is generated according to the following formula:

$$k_{auth}=F(K_{31},N_1), \quad (5)$$

The response code is generated according to the following formula:

$$C=E_{K_{23}}(N_2, B, K_{auth}), \quad (6)$$

wherein $N_2$ is the second challenge code or its corresponding value. In this embodiment, the principle on how the IMSI is verified is not described herein again as it is done in the same manner as described in the first embodiment above. Similarly, the principles on how the series of random codes, the series of signature codes and the series of communication keys are generated are not described herein again as they are generated in the same manner as described in the first embodiment above. Similarly, the authentication data in the second embodiment has a similar format to that in the first embodiment.

The notification procedure S4' comprises a first step S41', a second step S42', a third step S43' and a fourth step S44'. In the first step S41', the visitor end 2 receives and decrypts the response code using the shared key in order to determine whether the received response code contains the second challenge code previously transmitted to the home end 3 by the visitor end 2 (the decrypted data may include, for example, the second challenge code or its corresponding value, the authentication data and the authentication key). If so, the authentication data and the authentication key are stored in the visitor end 2 in the second step S42'. In the third step S43', the visitor end 2 generates an authentication code using the first challenge code and the authentication key. The authentication code is generated in a conventional formula below:

$$D=E_{k_{auth}}(N_1), \quad (7)$$

wherein D is the authentication code and $K_{auth}$ is the authentication key. The visitor end 2 then sends the authentication code and a selected random code of the series of random codes (such as $r_0$) to the user end 1 in the fourth step S44'.

The authentication procedure S5' consists of a first step S51', a second step S52', a third step S53', a fourth step S54' and a fifth step S55'. In the first step S51', the user end 1 generates another authentication key by performing an operation on the first challenge code and the ciphering key based on the first hash function (such as the A8 one-way hash function). The authentication key generated by the user end 1 in the first step S51' is the same as the authentication key generated by the home end 3 in the second step S32'. In the second step S52', the user end 1 generates another authentication code based on the authentication key to verify whether the authentication code received from the visitor end 2 is correct, as well as to determine whether the first challenge code received from the visitor end 2 is the same as the first challenge code transmitted to the visitor end 2 by the user end 1.

In the third step S53', the user end 1 generates an authentication signature code based on the ciphering key and the random code (such as $r_0$). In the fourth step S54', the user end 1 sends the authentication signature code to the visitor end 2. In the fifth step S55', the visitor end 2 authenticates the user end 1 based on the received authentication signature code. The principle on how the authentication signature code is generated is not described herein again as it is generated in a similar manner described in the first embodiment above.

In conclusion, the roaming authentication method in the second embodiment of the invention provides a two-way authentication mechanism in which the visitor end 2 and the home end 3 share the same shared key for data verification purposes. As such, it is possible to transmit data through a public channel or over a long distance with high security. It is also possible to transmit data between different communication systems with high security. Thus, data interruption and interception can be prevented.

Figure 7:
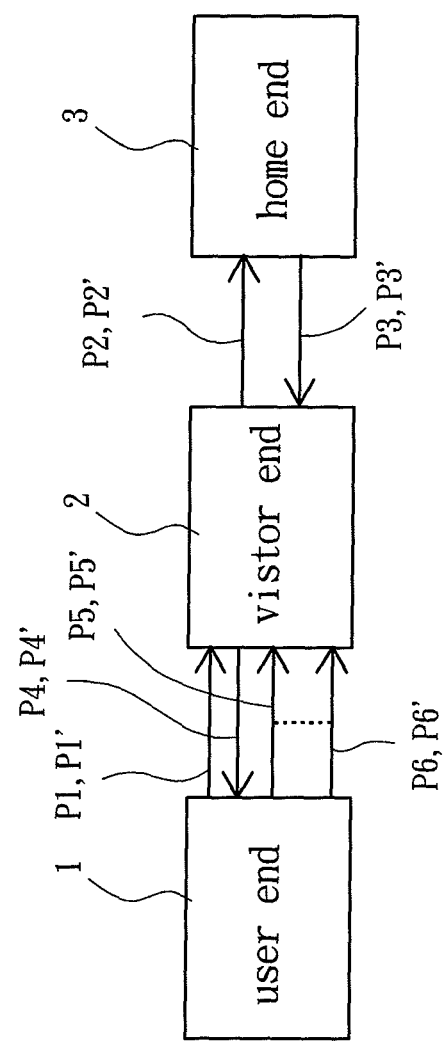
FIG. 7 shows a block diagram of a GSM system for executing a proposed roaming authentication method according to third and fourth embodiments of the invention.
Figure 8:
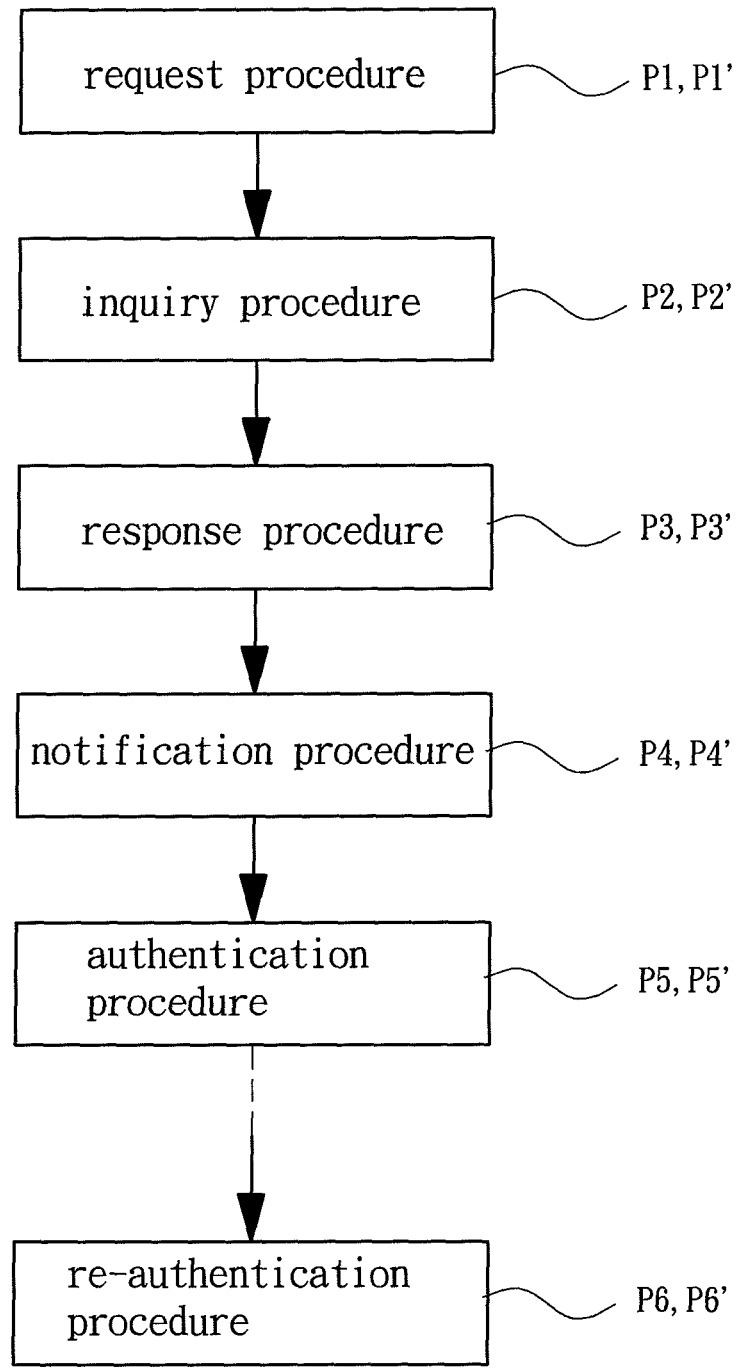
FIG. 8 shows a flowchart of the proposed roaming authentication method of the fifth and sixth embodiments of the invention.
Figure 9A:
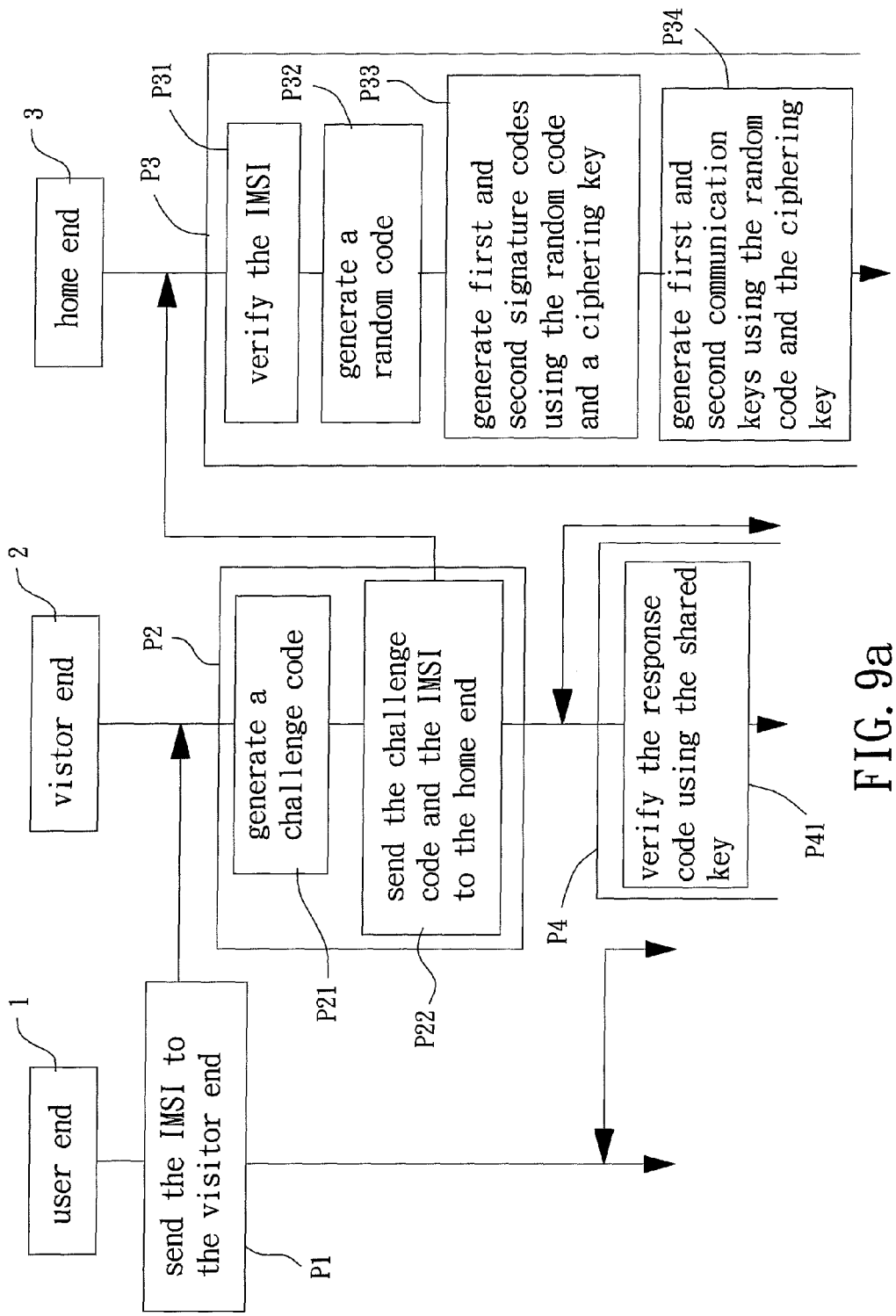
FIGS. 9a, 9b and 9c show the detailed procedures of the roaming authentication method according to the fifth embodiment of the invention.
Figure 9B:
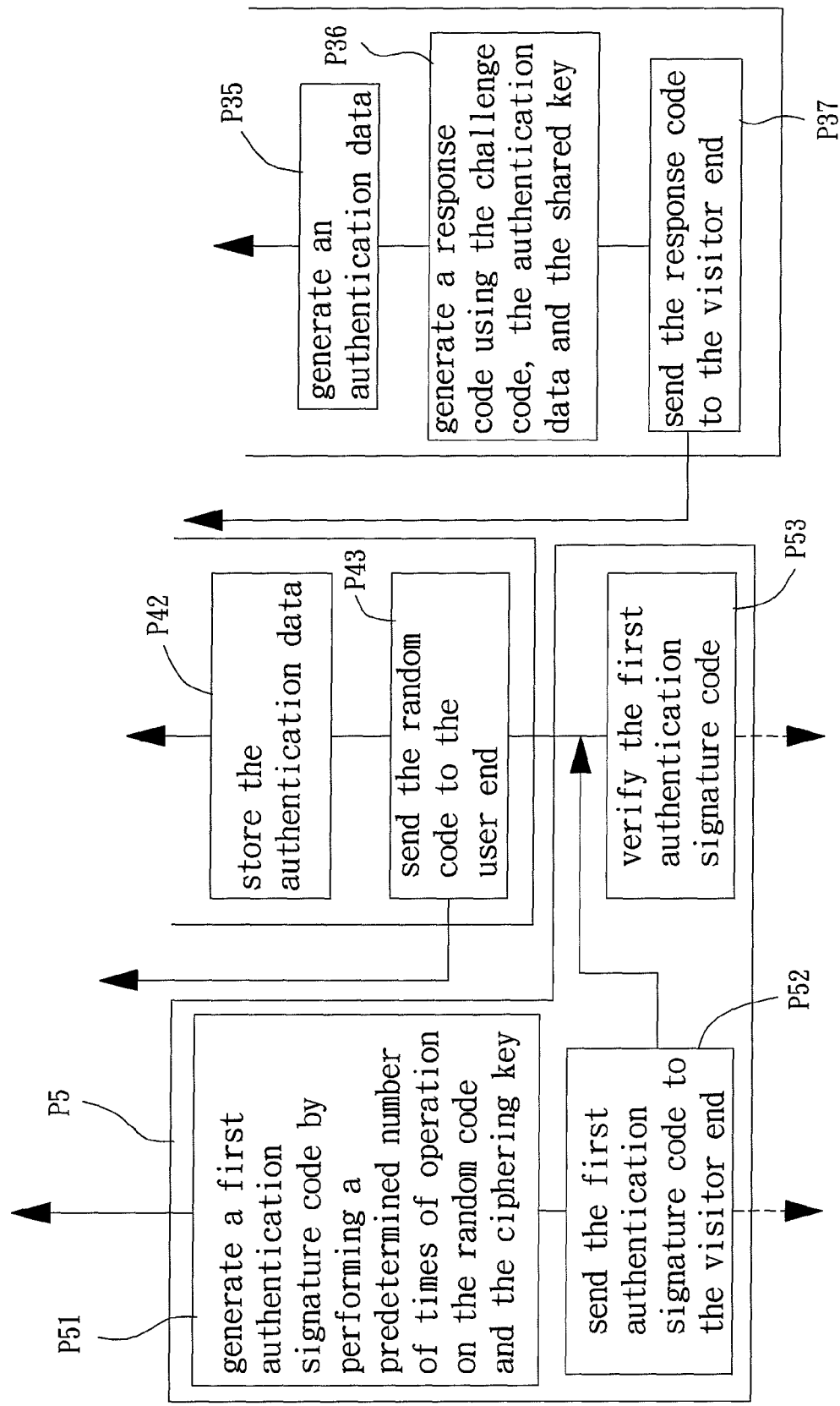
Figure 9C:
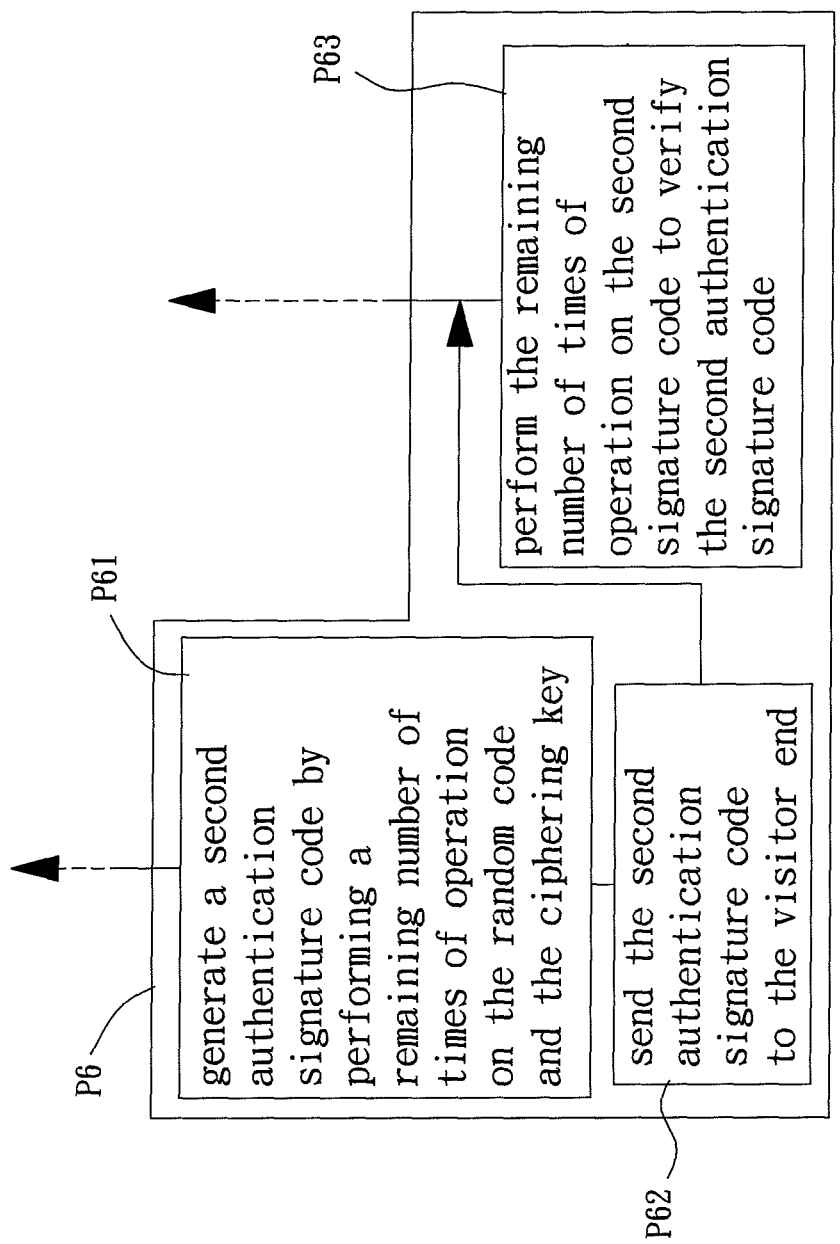

FIG. 7 shows a block diagram of a GSM system for executing a roaming authentication method proposed in third and fourth embodiments of the invention. In FIG. 7, the user end 1, the visitor end 2 and the home end 3 are similar to those shown in FIG. 3 and therefore they are not described herein again. FIG. 8 shows a flowchart of the roaming authentication method proposed in the third and fourth embodiments of the invention. FIGS. 9a, 9b and 9c show the detailed procedures of the roaming authentication method according to the third embodiment of the invention. The roaming authentication method in the third embodiment comprises a request procedure P1, an inquiry procedure P2, a response procedure P3, a notification procedure P4, an authentication procedure P5 and a re-authentication procedure P6. The request procedure P1 and the inquiry procedure P2 are similar to the request procedure S1 and the inquiry procedure S2 described in the first embodiment above and therefore are not described herein again.

In the response procedure P3, the home end 3 determines whether the IMSI is correct and generates a random code, generates a first signature code, a second signature code (which is the secondary signature code as claimed in the appended claims), a first communication key and a second communication key (which is the secondary communication key as claimed in the appended claims) based on the random code and the ciphering key, combines the random code, the first and second signature codes and the first and second communication keys as an authentication data, generates a response code using the challenge code, the authentication data and the shared key, and sends the response code to the visitor end 2. The response procedure P3 consists of a first step P31, a second step P32, a third step P33, a fourth step P34, a fifth step P35, a sixth step P36 and a seventh step P37 performed by the home end 3, as elaborated below.

In the first step P31, the home end 3 receives the IMSI and determines whether the IMSI is correct. In the second step P32, the home end 3 generates the random code. The random code is a numerical number generated in a random manner without repetition and is used once only. In the third step P33, the home end 3 generates the first and second signature codes based on the random code and the ciphering key. The ciphering key was already stored in the user end 1 and the home end 3.

The home end 3 is able to generate the first signature code for authentication purposes of the user end 1 by performing a predetermined number of times of operation on the random code and the ciphering key based on the first hash function. The first signature code is generated according to the following formula:

$$s_m=H^m(K_{31},r_0), \quad (8)$$

wherein $s_m$ is the first signature code and m is the predetermined number. If m is 10, for example, it indicates that the formula (8) is performed 10 times. Furthermore, the home end 3 is able to generate the second signature code for authentication purpose of the user end 1 by performing an operation on the random code and the ciphering key based on the first hash function. The second signature code is generated according to the following formula:

$$s_0 = H(K_{31}, r_0), \quad (9)$$

In the fourth step P34, the home end 3 generates the first communication key based on the random code and the ciphering key for authentication purpose of the user end 1. Specifically, the home end 3 is able to generate the first communication key for authentication purpose of the user end 1 by performing the predetermined number of times of operation on the random code and the ciphering key based on the second hash function. The first communication key is generated according to the following formula:

$$k_m = F^m(K_{31}, r_0). \quad (10)$$

Furthermore, the home end 3 is able to generate the second communication key for authentication purpose of the user end 1 by performing an operation on the random code and the ciphering key based on the second hash function. The second communication key is generated according to the following formula:

$$k_0 = F(K_{31}, r_0). \quad (11)$$

In the fifth step P35, the home end 3 combines the random code, the first and second signature codes and the first and second communication keys as the authentication data for authentication purpose of the user end 1. The authentication data has the following format:

$$B = (r_0, s_m, k_m, s_0, k_0). \quad (12)$$

In the sixth step P36, the home end 3 generates the response code using the challenge code, the authentication data and the shared key. Specifically, the shared key can be used to encrypt or decrypt data for improved security. The home end 3 can choose to send the challenge code or its corresponding value to the visitor end 2 for the visitor end 2 to identify the identity of the home end 3. In this embodiment, the home end 3 chooses to send the challenge code to the visitor end 2. Thus, the home end 3 generates the response code by encrypting the challenge code and the authentication data using the shared key. The response code may be generated according to the formula (4) above. In the seventh step P37, the home end 3 sends the response code to the visitor end 2 via a public channel.

In the notification procedure P4, the visitor end 2 verifies the response code using the shared key and sends the random code to the user end 1. The notification procedure S4 consists of a first step P41, a second step P42 and a third step P43.

In the first step P41, the visitor end 2 receives the response code and verifies the response code using the shared key. The principle on how the response code is verified has been described in the first embodiment above and therefore is not described herein again.

In the second step P42, the visitor end 2 stores the authentication data if the verification result of the response code is positive. In the third step P43, the visitor end 2 sends the random code to the user end 1. Accordingly, the user end 1 can be authenticated based on whether the user end 1 sends a correct signature code corresponding to the random code to the visitor end 2.

In the authentication procedure P5, the user end 1 generates a first authentication signature code by performing the predetermined number of times of operation on the ciphering key and the random code, and sends the first authentication signature code to the visitor end 2 for authentication purpose. If the authentication result is positive, the visitor end 2 provides the user end 1 with requested roaming service. The authentication procedure P5 consists of a first step P51 and a second step P52 performed by the user end 1, as well as a third step P53 performed by the visitor end 2.

In the first step P51, the user end 1 receives the random code from the visitor end 2 and generates the first authentication signature code by performing the predetermined number of times of operation (such as 10 times) on the random code and the ciphering key based on the first hash function. Specifically, due to the facts that the user end 1 and the home end 3 share the ciphering key and that the user end 1 and the home end 3 have the ability to generate the first signature code (using the A3 one-way hash function), the user end 1 can generate the first authentication signature code based on the repeated operations on the random code and the ciphering key.

In the second step P52, the user end 1 sends the first authentication signature code to the visitor end 2. Since the user end 1 generates the first authentication signature code in a manner similar to that of the first signature code of the home end 3, the first authentication signature code can be used by the visitor end 2 to determine whether the user end 1 is authentic.

In the second step P53, the visitor end 2 verifies the first authentication signature code. Specifically, since the visitor end 2 has the authentication data, the visitor end 2 is able to find out the first signature code from the authentication data ($s_m$) and compares the first signature code ($s_m$) with the first authentication signature code received from the user end 1. If the comparison result is consistent, the user end 1 passes the authentication and will be provided with requested roaming service.

If the user end 1 requests the roaming service from the visitor end 2 again, the re-authentication procedure P6 is performed.

In the re-authentication procedure P6, the user end 1 generates a second authentication signature code (which is the secondary authentication signature code as claimed in the appended claims) by performing a remaining number of times of operation on the ciphering key and the random code, and sends the second authentication signature code to the visitor end 2. To verify whether the received second authentication signature code is correct, the visitor end 2 performs the remaining number of times of operation on the second signature code for authentication purpose. If the authentication result is positive, the visitor end 2 provides the user end 1 with requested roaming service. The remaining number of times is the difference between the predetermined number of times and the number of times that the user end 1 has requested the roaming service. The re-authentication procedure P6 consists of a first step P61 and a second step P62 performed by the user end 1, as well as a third step P63 performed by the visitor end 2.

In the first step P61, the user end 1 generates the second authentication signature code by performing the remaining number of times of operation on the random code and the ciphering key. Specifically, due to the facts that the user end 1 and the home end 3 share the ciphering key and that the user end 1 and the home end 3 have the ability to generate the second signature code, the user end 1 can generate the second authentication signature code by performing the remaining number of times of operation on the random code and the ciphering key based on the one-way hash function. As an example, if the predetermined number is 10 and the user end 1 has requested the roaming service from the visitor end 2 for the second time, the remaining number will be 9 since the visitor end 2 has provided the user end 1 with required roaming service for one time so far.

Therefore, the user end 1 generates the second authentication signature code by performing 9 times of operation on the ciphering key and the random code as required. Similarly, if the user end 1 has requested the roaming service from the visitor end 2 for the third time, the remaining number will be 8 since the visitor end 2 has provided the user end 1 with required roaming service for two times so far.

In the second step P62, the user end 1 sends the second authentication signature code to the visitor end 2. Since the user end 1 generates the second authentication signature code in a manner similar to that of the second signature code of the home end 3, the second authentication signature code can be used by the visitor end 2 to authenticate the user end 1.

In the second step P63, the visitor end 2 performs the remaining number of times of operation on the second signature code to verify the second authentication signature code. Specifically, since the visitor end 2 has the authentication data, the visitor end 2 is able to find out the random code from the authentication data ($s_m$) and to generate a re-authentication verification code by performing the remaining number of times of operation on the random code and the ciphering key based on the one-way hash function. The re-authentication verification code should be the same as the second authentication signature code in order to determine whether the second authentication signature code is correct. If the second authentication signature code is correct, the user end 1 passes the authentication and will be provided with requested roaming service again.

In conclusion, the roaming authentication method in the third embodiment of the invention provides a one-way authentication mechanism in which both the visitor end 2 and the home end 3 can verify the data based on the shared key shared therebetween. As such, it is possible to transmit data through a public channel or over a long distance with high security. It is also possible to transmit data between different communication systems with high security. Thus, data interruption and interception can be prevented.

Furthermore, when the user end 1 requests the roaming service from the visitor end 2 again, the visitor end 2 is able to generate the data required for authentication purpose of the user end 1 by itself without having to acquire the data from the home end 3 again, significantly lowering the data traffic between the visitor end 2 and the home end 3. This advantage is achieved based on the backward hash chain operation of the one-way hash function. As such, the calculation burden of the home end 3 is reduced. In addition, the data is less likely to experience interruption or interception during the transmission phase, improving the security of data transmission.

Figure 10A:
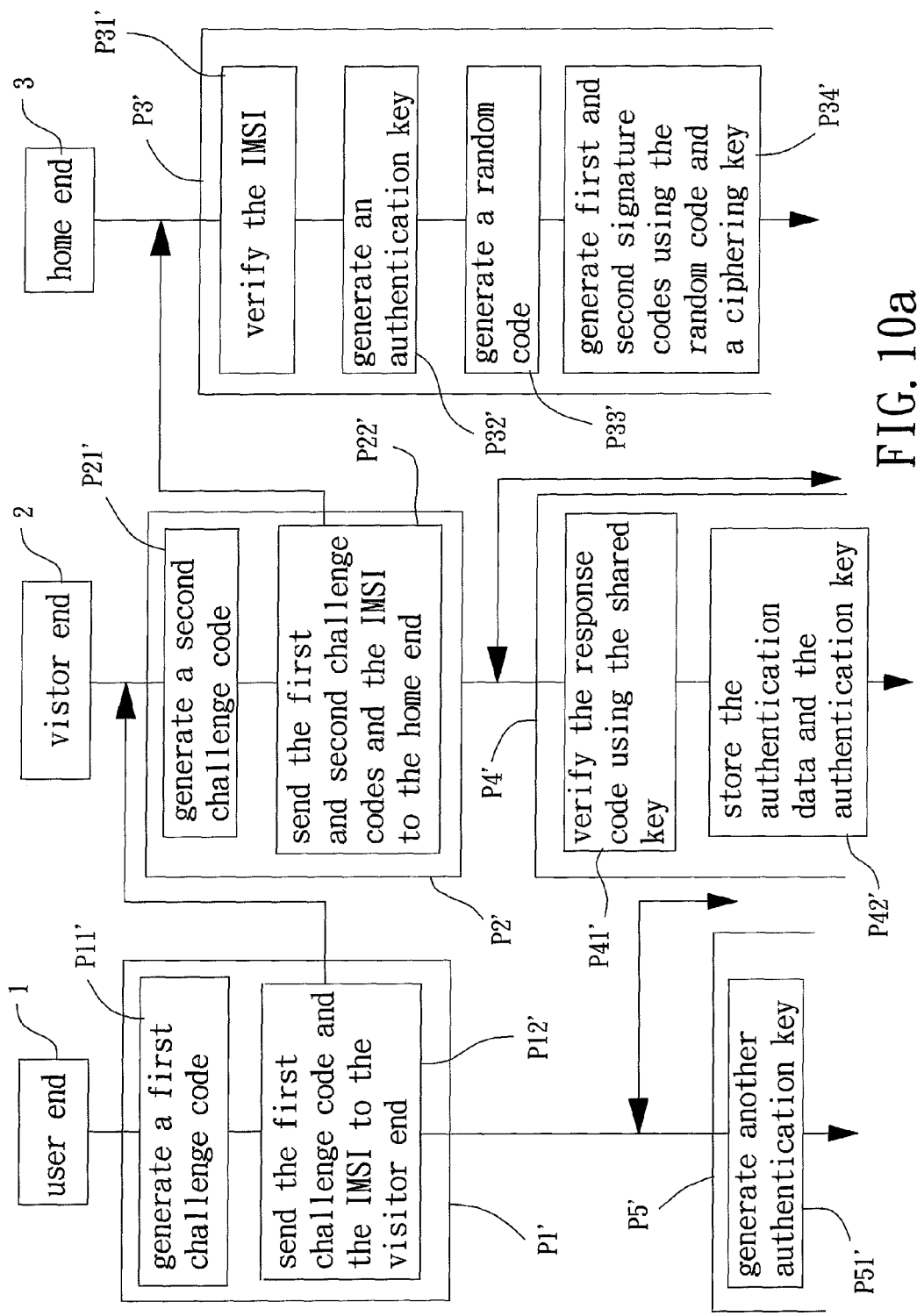
FIGS. 10a, 10b and 10c show the detailed procedures of the roaming authentication method according to the second embodiment of the invention.
Figure 10B:
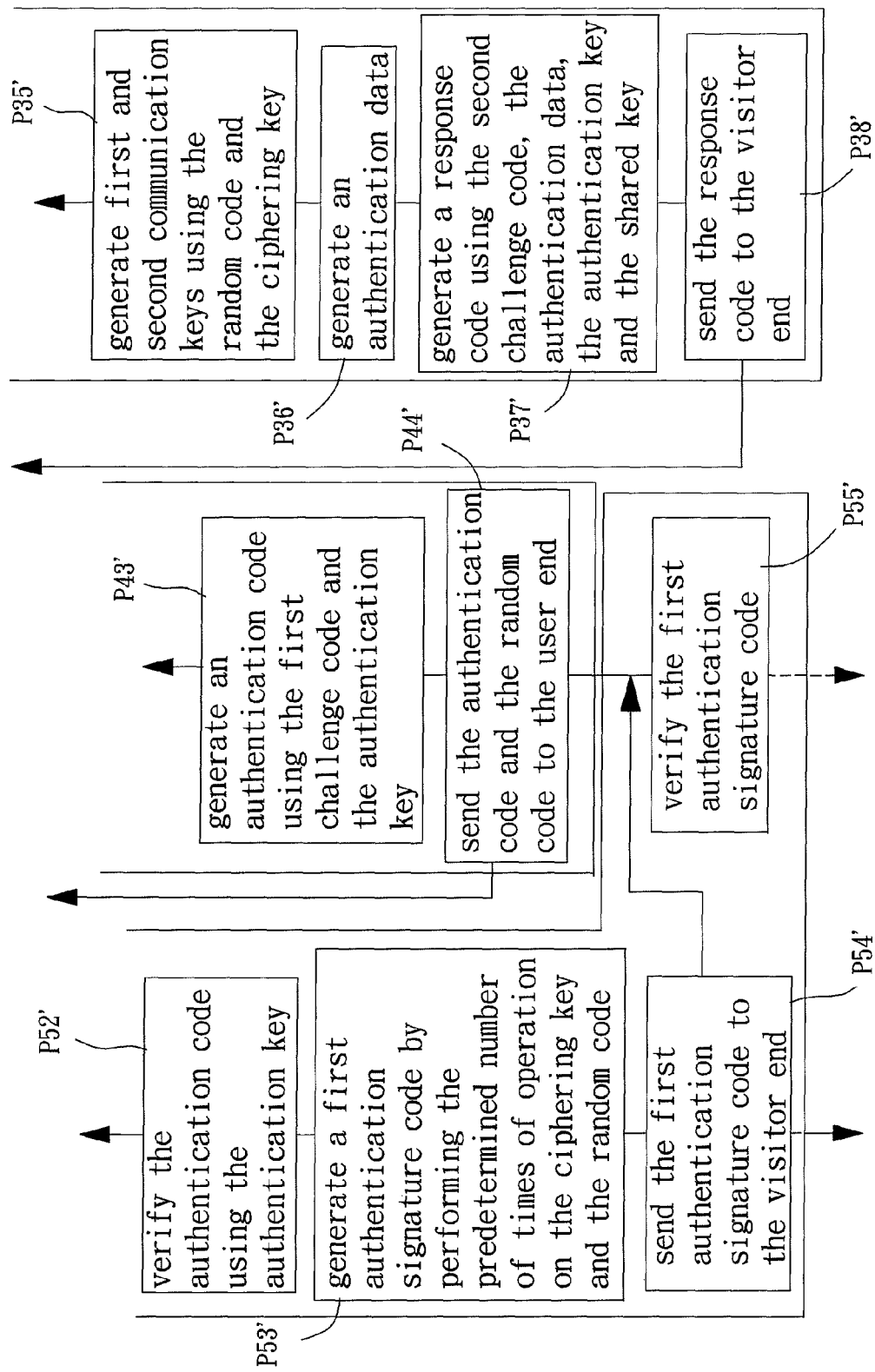
Figure 10C:
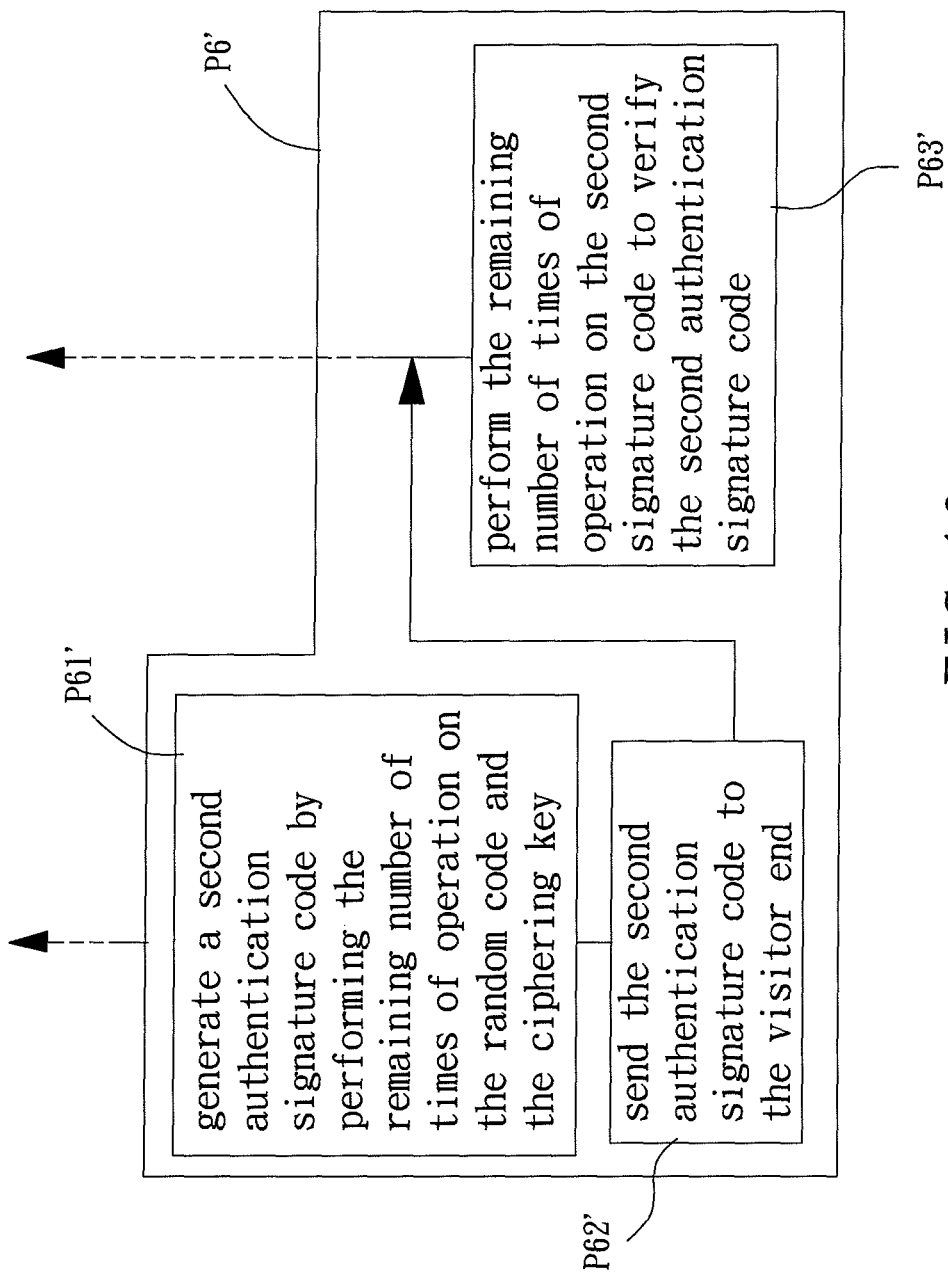

FIGS. 10a, 10b and 10c show the detailed procedures of the roaming authentication method according to the fourth embodiment of the invention. The roaming authentication method in the fourth embodiment provides a two-way authentication mechanism and comprises a request procedure P1', an inquiry procedure P2', a response procedure P3', a notification procedure P4', an authentication procedure P5' and a re-authentication procedure P6'.

The request procedure P1' and the inquiry procedure P2' are not described herein again as they are similar to the request procedure S1' and the inquiry procedure S2' in the second embodiment above.

The response procedure P3' comprises a first step P31', a second step P32', a third step P33', a fourth step P34', a fifth step P35', a sixth step P36', a seventh step P37' and an eighth step P38'. In the first step P31', the home end 3 verifies the IMSI. In the second step P32', the home end 3 generates an authentication key. In the third step P33', the home end 3 generates a random code. In the fourth step P34', the home end 3 generates first and second signature codes based on the random code and the ciphering key. In the fifth step P35', the home end 3 generates first and second communication keys based on the random code and the ciphering key. In the sixth step P36', the home end 3 combines the random code, the first and second signature codes and the first and second communication keys as an authentication data. In the seventh step P37', the home end 3 generates a response code using the second challenge code, the authentication data, the authentication key and the shared key. In the eighth step P38', the home end 3 sends the response code to the visitor end 2. The authentication key is generated according to the above formula (5). The response code is generated according to the above formula (6).

The notification procedure P4' comprises a first step P41', a second step P42', a third step P43' and a fourth step P44'. In the first step P41', the visitor end 2 receives and decrypts the response code using the shared key to determine whether the received response code contains the second challenge code previously transmitted to the home end 3 by the visitor end 2 (the decrypted data may include, for example, the second challenge code or its corresponding value, the authentication data and the authentication key). If so, the authentication data and the authentication key are stored in the visitor end 2 in the second step S42'. In the third step S43', the visitor end 2 generates an authentication code using the first challenge code and the authentication key. The authentication code is generated according to the above formula (7).

The authentication procedure P5' consists of a first step P51', a second step P52', a third step P53', a fourth step P54' and a fifth step P55'. In the first step P51', the user end 1 generates another authentication key by performing an operation on the first challenge code and the ciphering key based on the hash function. In the second step P52', the user end 1 generates another authentication code based on the authentication key to confirm whether the authentication code received from the visitor end 2 is correct as well as to confirm whether the first challenge code contained in the received authentication code is the same as the first challenge code previously transmitted to the visitor end 2 by the user end 1. In this manner, the user end 1 is able to identify the identity of the visitor end 2. In the third step P53', the user end 1 generates a first authentication signature code based on the ciphering key and the random code. In the fourth step P54', the user end 1 sends the first authentication signature code to the visitor end 2. In the fifth step P55', the visitor end 2 authenticates the user end 1 based on the first authentication signature code received. If the first authentication signature code is correct, the user end 1 passes the authentication and will be provided with requested roaming service again. The principle on how the first authentication signature code is generated is not described herein again as it is done in a similar manner described in the third embodiment above.

The re-authentication procedure P6' consists of a first step P61' and a second step P62' performed by the user end 1, as well as a third step P63' performed by the visitor end 2. In the first step P61', the user end 1 generates the second authentication signature code by performing the remaining number of times of operation on the random code and the ciphering key. In the second step P62', the user end 1 sends the second authentication signature code to the visitor end 2. In the second step P63', the visitor end 2 performs the remaining number of times of operation on the second signature code to verify the second authentication signature code. If the second authentication signature code is correct, the user end 1 passes the authentication and will be provided with requested roaming service again. The principle on how the second authentication signature is generated is not described herein again as it is done in a similar manner described in the third embodiment above.

In conclusion, the roaming authentication method in the fourth embodiment of the invention provides a two-way authentication mechanism in which the visitor end 2 and the home end 3 share the same shared key for data verification purposes. As such, it is possible to transmit data through a public channel or over a long distance with high security. It is also possible to transmit data between different communication systems with high security. Thus, data interruption and interception can be prevented.

Furthermore, when the user end 1 requests the roaming service from the visitor end 2 again, the visitor end 2 is able to generate the data required for authentication purpose of the user end 1 by itself without having to acquire the data from the home end 3 again, significantly lowering the amount of data transmitted by the visitor end 2 as well as the calculation burden of the home end 3. This advantage is achieved based on the backward hash chain operation of the one-way hash function. As such, the calculation burden of the home end 3 is reduced. Also, secure data transmission is provided during the data transmission phase of the visitor end 2.

Based on the above features, the roaming authentication methods in the third and fourth embodiments have the advantage that both the user end 1 and the home end 3 are able to generate an authentication key for data verification purposes according to the ciphering key shared between the user end 1 and the home end 3 as well as the shared key shared between the visitor end 2 and the home end 3. As such, it is possible to transmit data through a public channel or over a long distance with high security. It is also possible to transmit data between different communication systems with high security. Thus, data interruption and interception can be prevented.

Furthermore, when the user end 1 requests the roaming service from the visitor end 2 again, the user end 1 is able to generate a different second authentication signature code and the visitor end 2 is able to directly generate the data required for authentication purpose of the user end 1 by itself without having to acquire the data from the home end 3 again, significantly lowering the data traffic between the visitor end 2 and the home end 3. This advantage is achieved by the user end 1 and the visitor end 2 performing the backward hash chain operation of the one-way hash function. As such, the calculation burden of the home end 3 and the risk of data interruption and interception are further reduced.

Figure 11:
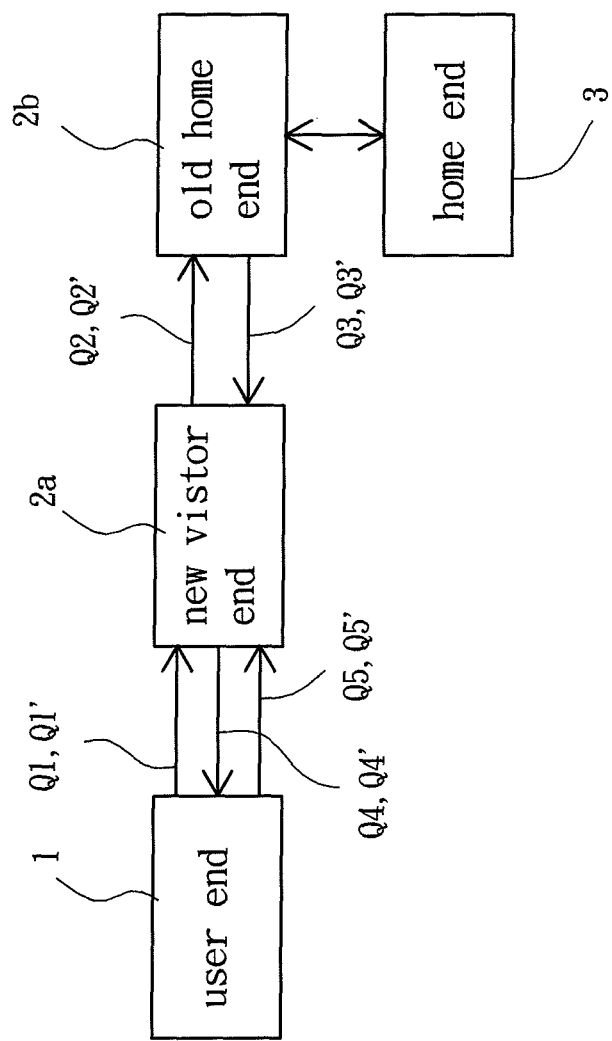
FIG. 11 shows a block diagram of a GSM system for executing a proposed roaming authentication method according to fifth and sixth embodiments of the invention.

FIG. 11 shows a block diagram of a GSM system for executing a roaming authentication method as proposed in fifth and sixth embodiments of the invention. The GSM system comprises a user end 1, a new visitor end 2a (i.e. a new visitor location register, VLR), an old visitor end 2b (i.e. an old visitor location register, VLR) and a home end 3 (i.e. a home location register, HLR). The new visitor end 2a is coupled between the user end 1 and the old visitor end 2b. The home end 3 is coupled to the old visitor end 2b.

It is noted that the term "ciphering key" referred hereinafter is a key shared between the user end 1 and the old visitor end 2b for the purposes of data encryption and decryption, as it can be readily appreciated by one having ordinary skill in the art.

It is also noted that the term "shared key" referred hereinafter is a key shared between the new visitor end 2a and the old visitor end 2b for the purposes of data encryption and decryption, as it can be readily appreciated by one having ordinary skill in the art. It is also noted that the term "authentication key" referred hereinafter is a key that both the user end 1 and the old visitor end 2b are able to generate by themselves for the authentication purpose of the user end 1, as it can be readily appreciated by one having ordinary skill in the art.

Figure 12:
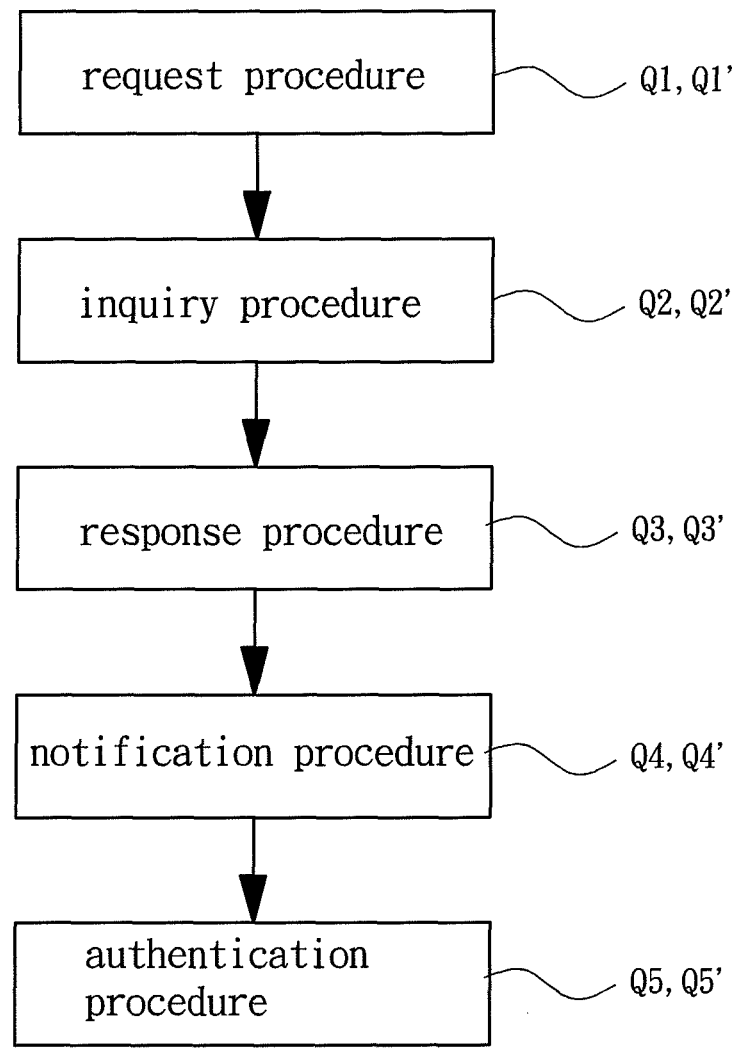
FIG. 12 shows a flowchart of the proposed roaming authentication method of the fifth and sixth embodiments of the invention.
Figure 13A:
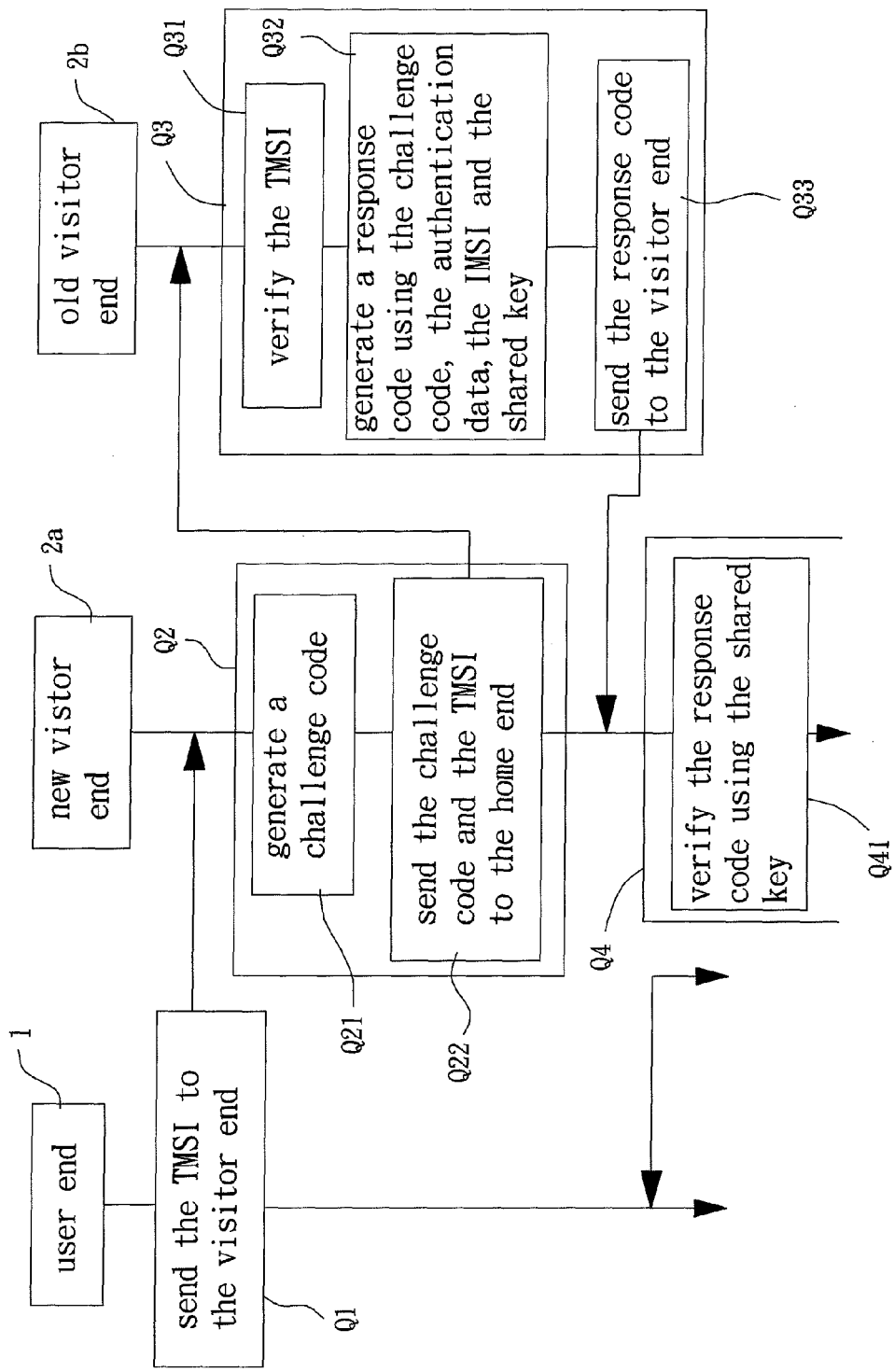
FIGS. 13a and 13b show the detailed procedures of the roaming authentication method according to the fifth embodiment of the invention.
Figure 13B:
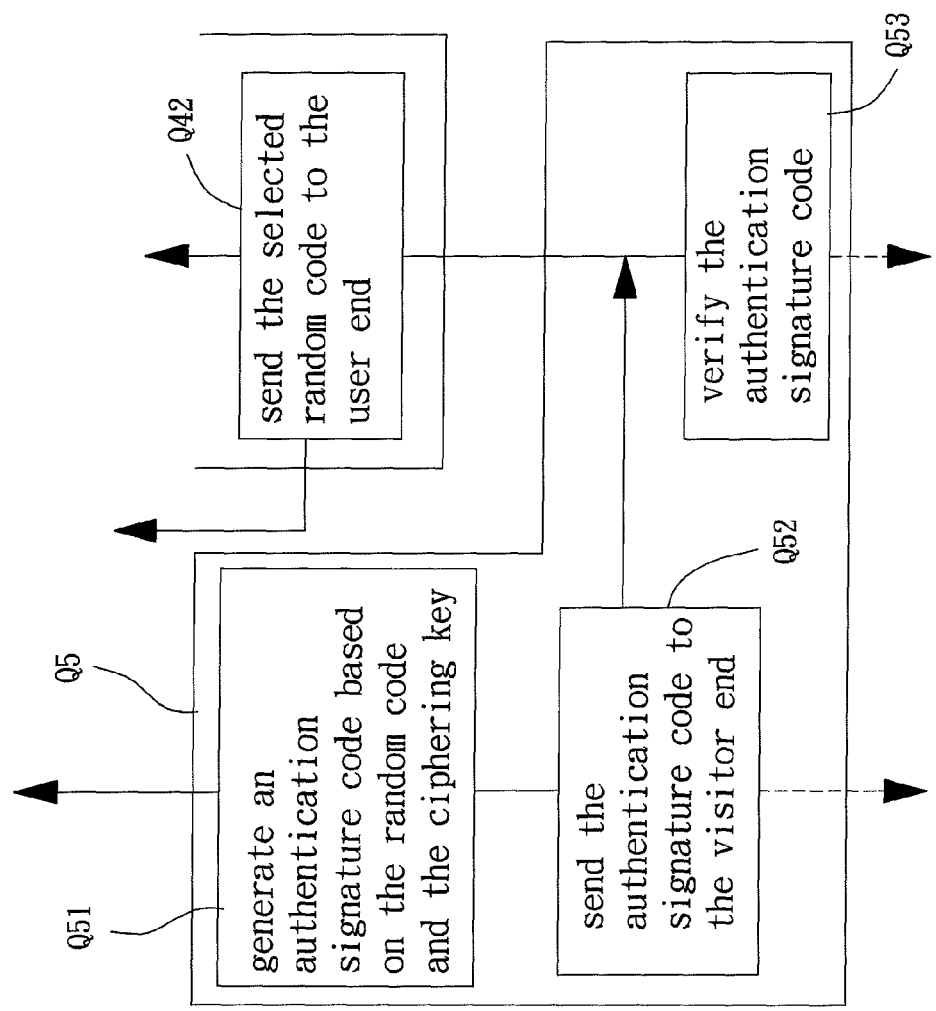

FIG. 12 shows a flowchart of the roaming authentication method proposed in the fifth and sixth embodiments of the invention. FIGS. 13a and 13b show the detailed procedures of the roaming authentication method according to the fifth embodiment of the invention. The roaming authentication method comprises a request procedure Q1, an inquiry procedure Q2, a response procedure Q3, a notification procedure Q4 and an authentication procedure Q5.

In the request procedure Q1, the user end 1 transmits its temporary mobile subscriber identity (TMSI) to the new visitor end 2a to request a roaming service from the new visitor end 2a. Specifically, since the old visitor end 2b has assigned the TMSI to the user end 1 when the user end 1 was within the signal range of the old visitor end 2b, the user end 1 is able to request the roaming service from the new visitor end 2a. At the time the user end 1 initially moves into the signal range of the new visitor end 2a, the new visitor end 2a is unable to authenticate the user end 1 due to the lack of the authentication data required. In this regard, the new visitor end 2a must request the required data from the old visitor end 2b for authentication purpose of the user end 1. The new visitor end 2a provides the user end 1 with requested roaming service if the authentication result of the user end 1 is positive.

In the inquiry procedure Q2, the new visitor end 2a generates a challenge code. The new visitor end 2a transmits the challenge code and the TMSI to the old visitor end 2b. The inquiry procedure Q2 consists of a first step Q21 and a second step Q22 performed by the new visitor end 2a, as elaborated below.

In the first step Q21, the new visitor end 2a receives the TMSI and generates the challenge code. Specifically, when the new visitor end 2a receives the TMSI from the user end 1, the new visitor end 2a realizes that the user end 1 is requesting for roaming service from the new visitor end 2a. At the time, the new visitor end 2a stores the TMSI and acquires the associated data from the old visitor end 2b that is required for authentication purpose of the user end 1. To ensure that the acquired data is valid, the new visitor end 2a generates and stores the challenge code.

In the second step Q22, the new visitor end 2a transmits the challenge code and the TMSI to the old visitor end 2b. Specifically, since both the user end 1 and the old visitor end 2b have the TMSI, the new visitor end 2a is able to acquire the associated data from the old visitor end 2b (required for authentication purpose of the user end 1) based on the TMSI. The acquired data is deemed valid if the old visitor end 2b successfully and correctly sends the challenge code (or its corresponding value) back to the new visitor end 2a.

In the response procedure Q3, the old visitor end 2b determines whether the TMSI is correct, generates a response code using the challenge code, an authentication data, an IMSI and a shared key, and sends the response code to the new visitor end 2a. The response procedure Q3 consists of a first step Q31, a second step Q32 and a third step Q33, as elaborated below.

In the first step Q31, the old visitor end 2b receives the TMSI and determines whether the IMSI is correct. Specifically, since the old visitor end 2b and the user end 1 have the same TMSI, the old visitor end 2b is able to compare the stored TMSI with the TMSI received from the new visitor end 2a. If the comparison result is consistent (namely, the TMSI stored in the old visitor end 2b is the same as the TMSI received from the new visitor end 2a), the second step Q32 is performed. If the comparison result is inconsistent, the following steps are not performed.

In the second step Q32, the old visitor end 2b generates the response code using the challenge code, the authentication data, the IMSI and the shared key. Specifically, the authentication data and the IMSI are stored in the old visitor end 2b in advance. The authentication data comprises a series of random codes, a series of signature codes and a series of communication keys. The series of random codes consists of a plurality of random codes, such as $r_1, \ldots, r_m$ (m random codes). The series of signature codes consists of a plurality of signature codes, such as $s_1, \ldots, s_m$ (m signature codes). The series of communication keys consists of a plurality of communication keys, such as $k_1, \ldots, k_m$ (m communication keys). The shared key can be used to encrypt or decrypt data for improved security. In other words, the data transmitted from the old visitor end 2b to the new visitor end 2a can be protected from malicious invasions, such as data interruption or interception. Optionally, the old visitor end 2b can choose to send the challenge code or its corresponding value to the new visitor end 2a for the new visitor end 2a to identify the identity of the old visitor end 2b. The corresponding value of the challenge code may be the binary complement of the challenge code. In this embodiment, the old visitor end 2b chooses to send the challenge code to the new visitor end 2a. Thus, the old visitor end 2b generates the response code by encrypting the challenge code, the authentication data and the IMSI using the shared key. The response code may be generated in a conventional manner below:

$$C = E_{K_{2a2b}}(N, B, IMSI), \quad (13)$$

wherein $K_{2a2b}$ is the shared key shared between the old visitor end 2b and the new visitor end 2a.

In the third step Q33, the old visitor end 2b sends the response code to the new visitor end 2a via a public channel.

In the notification procedure Q4, the new visitor end 2a verifies the response code using the shared key, selects one random code from the series of random codes, and sends the selected random code to the user end 1. The notification procedure Q4 consists of a first step Q41 and a second step Q42.

In the first step Q41, the new visitor end 2a receives the response code and verifies the response code using the shared key. Specifically, since the new visitor end 2a and the old visitor end 2b share the shared key, the new visitor end 2a is able to decrypt the response code using the shared key. The decryption principle of the response code is not described herein as it is performed in a manner corresponding to the encryption manner of the old visitor end 2b. Based on the decrypted data, the new visitor end 2a is able to determine whether the received response code contains the challenge code previously transmitted to the old visitor end 2b by the new visitor end 2a (or contains the corresponding value of the challenge code). If the determination result is positive, the new visitor end 2a stores the authentication data. If the determination result is negative, the following steps are not performed. In this manner, it can be determined whether the response code is provided by an authentic old visitor end 2b.

In the second step Q42, the new visitor end 2a sends the selected random code to the user end 1. If the selected random code has already been selected before, then that random code is not selected again. In other words, every random code is not repeatedly selected. As an example, the first random code $r_1$ is selected for first time authentication purposes, and the remaining random codes $r_{2, 3, \ldots, m}$ are selected in sequence for future authentication operations. After the new visitor end 2a records the selected random code, the new visitor end 2a sends the selected random code to the user end 1. Accordingly, the user end 1 can be authenticated based on whether the user end 1 sends a correct signature code corresponding to the selected random code to the new visitor end 2a.

In the authentication procedure Q5, the user end 1 generates an authentication signature code based on the ciphering key and the received random code, and sends the authentication signature code to the new visitor end 2a for authentication purpose. If the authentication result is positive, the new visitor end 2a provides the user end 1 with requested roaming service. The authentication procedure Q5 consists of a first step Q51 and a second step Q52 performed by the user end 1, as well as a third step Q53 performed by the new visitor end 2a.

In the first step Q51, the user end 1 receives the random code from the new visitor end 2a and generates the authentication signature code by performing an operation on the random code and the ciphering key based on a hash function (such as the A3 one-way hash function). Specifically, due to the facts that the user end 1 and the home end 3 share the ciphering key and that the user end 1 has the ability to generate the signature code (using the A3 one-way hash function), the user end 1 can generate the authentication signature code based on the random code and the ciphering key.

In the second step Q52, the user end 1 sends the authentication signature code to the new visitor end 2a. Since the user end 1 generates the authentication signature code in a manner similar to that of the signature code of the new visitor end 2a, the authentication signature code can be used by the new visitor end 2a to determine whether the user end 1 is authentic or not.

In the second step Q53, the new visitor end 2a verifies the authentication signature code. Specifically, since the new visitor end 2a has the authentication data and knows which random code was previously sent to the user end 1 (such as $r_1$), the new visitor end 2a is able to find out the corresponding signature code from the authentication data (such as $s_1$) and compares the signature code (such as $s_1$) with the authentication signature code received from the user end 1. If the comparison result is consistent, the user end 1 passes the authentication and will be provided with requested roaming service.

In conclusion, the roaming authentication method in the fifth embodiment of the invention provides a one-way authentication mechanism in which both the new visitor end 2a and the old visitor end 2b can verify the data based on the shared key shared therebetween. As such, it is possible to transmit data through a public channel or over a long distance with high security. It is also possible to transmit data between different communication systems with high security. Thus, data interruption and interception can be prevented.

Figure 14A:
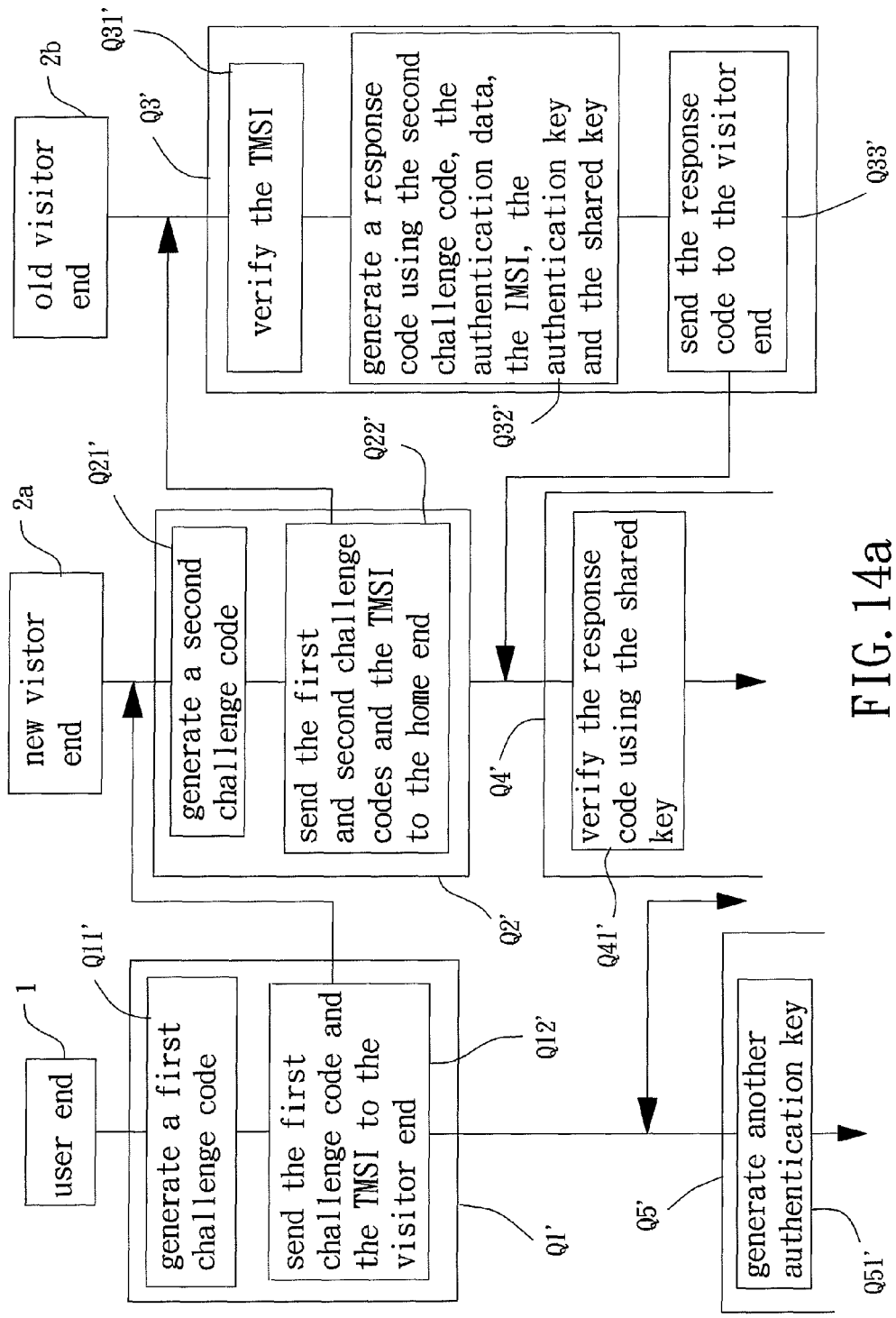
FIGS. 14a and 14b show the detailed procedures of the roaming authentication method according to the sixth embodiment of the invention.
Figure 14B:
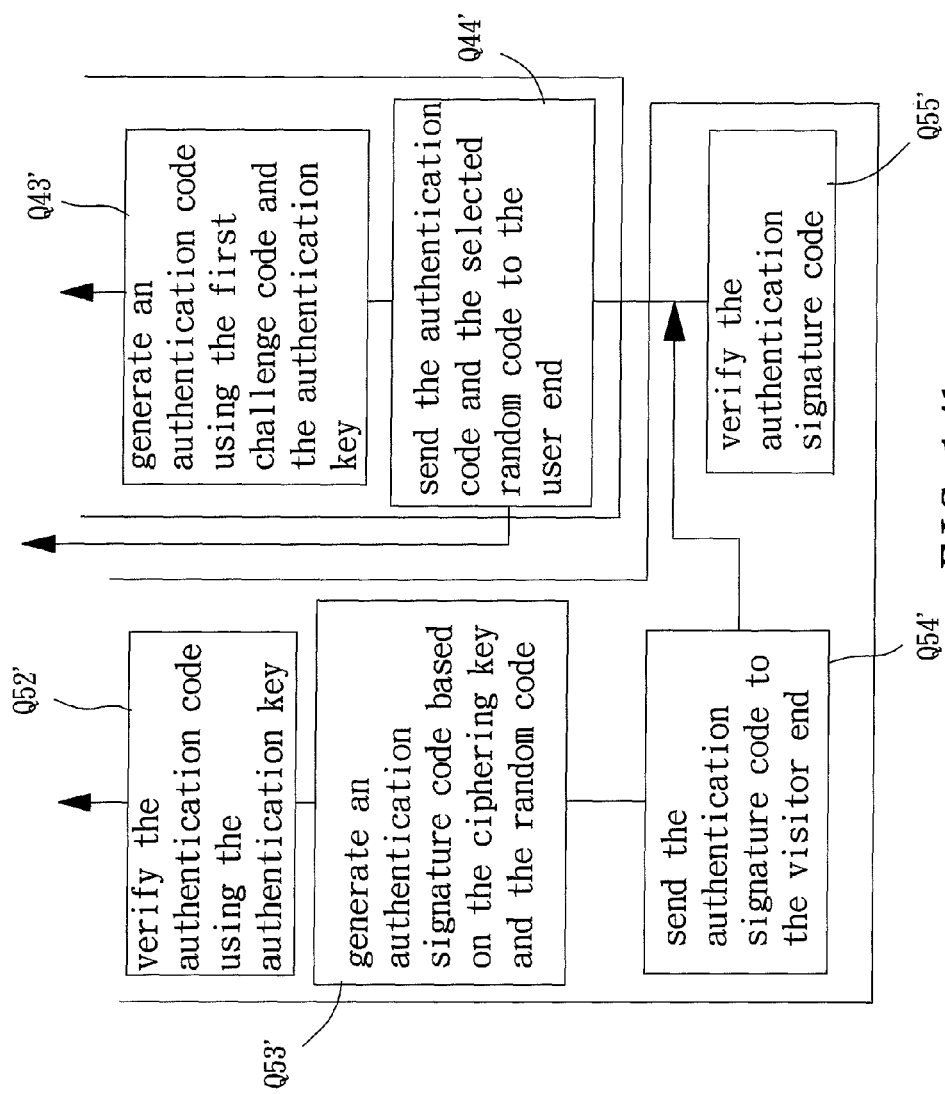

FIGS. 14a and 14b show the detailed procedures of the roaming authentication method according to the sixth embodiment of the invention. The roaming authentication method comprises a request procedure Q1', an inquiry procedure Q2', a response procedure Q3', a notification procedure Q4' and an authentication procedure Q5'.

The request procedure Q1' consists of a first step Q11' and a second step Q12'. In the first step Q11', the user end 1 generates a first challenge code. In the second step Q12', the user end 1 sends the first challenge code and the TMSI to the new visitor end 2a, requesting a roaming service from the new visitor end 2a. The inquiry procedure Q2' comprises a first step Q21' and a second step Q22'. In the first step Q21', the new visitor end 2a generates a second challenge code. In the second step Q22', the new visitor end 2a sends the first and second challenge codes and the TMSI to the old visitor end 2b. The response procedure Q3' comprises a first step Q31', a second step Q32' and a third step Q33'. In the first step Q31', the old visitor end 2b verifies the IMSI. In the second step Q32', the old visitor end 2b generates a response code using the second challenge code, an authentication data, an IMSI, an authentication key and a shared key. The authentication key is generated by the home end 3 and sent to the old visitor end 2b. The authentication key is stored in the old visitor end 2b after the user end 1 passes the authentication of the old visitor end 2b. The response code is generated in the following manner:

$$C = E_{K_{2a2b}}(N, B, IMSI, K_{auth}), \quad (14)$$

The notification procedure Q4' comprises a first step Q41', a second step Q42' and a third step Q43'. In the first step Q41', the new visitor end 2a receives and decrypts the response code using the shared key in order to determine whether the received response code contains the second challenge code previously transmitted to the old visitor end 2b by the new visitor end 2a. If so, the authentication data, the IMSI and the authentication key are stored in the new visitor end 2a in the second step Q42'. In the third step Q43', the new visitor end 2a generates an authentication code using the first challenge code and the authentication key. The authentication code is generated based on the above formula (7). Then, the new visitor end 2a sends the authentication code and a random code selected from the series of random codes (such as $r_1$) to the user end 1.

The authentication procedure Q5' consists of a first step Q51', a second step Q52', a third step Q53', a fourth step Q54' and a fifth step Q55'. In the first step Q51', the user end 1 generates another authentication key by performing an operation on the first challenge code and the ciphering key based on the hash function (such as the A8 one-way hash function). The authentication key generated by the user end 1 in the first step Q51' is the same as the authentication key generated by the old visitor end 2b in the second step Q32'. In the second step Q52', based on the authentication key generated in the first step Q51', the user end 1 verifies whether the authentication code received from the new visitor end 2a is correct, as well as verifying whether the first challenge code received from the new visitor end 2a is the same as the first challenge code transmitted to the new visitor end 2a by the user end 1. In the third step Q53', the user end 1 generates an authentication signature code based on the ciphering key and the random code (such as $r_1$). In the fourth step Q54', the user end 1 sends the authentication signature code to the new visitor end 2a. In the fifth step Q55', the new visitor end 2a authenticates the user end 1 based on the received authentication signature code.

In conclusion, the roaming authentication method in the sixth embodiment of the invention provides a two-way authentication mechanism in which the new visitor end 2a and the old visitor end 2b share the same shared key for data verification purposes. As such, it is possible to transmit data through a public channel or over a long distance with high security. It is also possible to transmit data between different communication systems with high security. Thus, data interruption and interception can be prevented.

Based on the above features, the roaming authentication methods in the fifth and sixth embodiments have the advantages that both the user end 1 and the old visitor end 2b share the ciphering key for data verification purposes, that the new visitor end 2a and the old visitor end 2b share the shared key for data verification purposes, and that the user end 1 and the old visitor end 2b have the same authentication key for data verification purposes. The authentication key is generated by the home end 3 and sent to the old visitor end 2b. The authentication key is then stored in the old visitor end 2b after the user end 1 passes the authentication. As such, it is possible to transmit data through a public channel or over a long distance with high security. It is also possible to transmit data between different communication systems with high security. Thus, data interruption and interception can be prevented.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A roaming authentication method for a GSM system, comprising:

sending an international mobile subscriber identity of a user end to a visitor end to request a roaming service from the visitor end, as performed by the user end in a request procedure;

generating a challenge code and sending the challenge code and the international mobile subscriber identity to a home end, as performed by the visitor end in an inquiry procedure;

determining whether the international mobile subscriber identity is correct and generating a random code, generating a signature code and a communication key based on the random code and a ciphering key, combining the random code, the signature code and the communication key as an authentication data, generating a response code using the challenge code, the authentication data and a shared key, and sending the response code to the visitor end, as performed by the home end in a response procedure;

verifying the response code using the shared key and sending the random code to the user end, as performed by the visitor end in a notification procedure; and generating an authentication signature code based on the ciphering key and the random code, and sending the authentication signature code to the visitor end for the visitor end to authenticate the user end, as performed by the user end in an authentication procedure.

2. The roaming authentication method for a GSM system as claimed in claim 1, wherein the challenge code is a numerical number generated in a random manner, a timestamp specifying time information, or a selected number obtained from a series of numbers with even or odd increments or decrements.

3. The roaming authentication method for a GSM system as claimed in claim 1, further comprising determining whether the challenge code contained in the response code is consistent with the challenge code previously transmitted to the home end by the visitor end, as performed by the visitor end in the notification procedure.

4. The roaming authentication method for a GSM system as claimed in claim 1, further comprising storing the authentication data in the visitor end in the notification procedure if the challenge code contained in the response code is consistent with the challenge code previously transmitted to the home end by the visitor end.

5. The roaming authentication method for a GSM system as claimed in claim 1, further comprising generating the authentication signature code by performing an operation on the ciphering key and the random code based on a first hash function, as performed by the user end in the authentication procedure.

6. The roaming authentication method for a GSM system as claimed in claim 1, further comprising generating the signature code by performing an operation on the random code and the ciphering key based on a first hash function, as performed by the home end in the response procedure.

7. The roaming authentication method for a GSM system as claimed in claim 1, further comprising generating the communication key by performing an operation on the random code and the ciphering key based on a second hash function, as performed by the home end in the response procedure.

8. The roaming authentication method for a GSM system as claimed in claim 1, further comprising selecting the random code from a series of random codes in sequence, as performed by the visitor end in the notification procedure.

9. The roaming authentication method for a GSM system as claimed in claim 1, further comprising generating a secondary signature code and a secondary communication key based on the random code and the ciphering key, and combining the random code, the signature code, the communication key, the secondary signature code and the secondary communication key as the authentication data, as performed by the home end in the response procedure, wherein the roaming authentication method further comprises a re-authentication procedure generating a secondary authentication signature code by performing a remaining number of times of operation on the ciphering key and the random code, and sending the secondary authentication signature code to the visitor end, as performed by the user end when requesting the roaming service from the visitor end again, wherein the roaming authentication method further performs the remaining number of times of operation on the secondary signature code to verify the secondary authentication signature code for the visitor end to authenticate the user end, as performed by the visitor end in the notification procedure, and wherein the remaining number of times is a difference between a predetermined number of times and a number of times that the user end has requested the roaming service from the visitor end.

10. The roaming authentication method for a GSM system as claimed in claim 9, further comprising generating the secondary signature code by performing an operation on the random code and the ciphering key based on a first hash function, as performed by the home end in the response procedure.

11. The roaming authentication method for a GSM system as claimed in claim 9, further comprising generating the secondary communication key by performing an operation on the random code and the ciphering key based on a second hash function, as performed by the home end in the response procedure.

12. A roaming authentication method for a GSM system, comprising:
generating a first challenge code and sending the first challenge code and an international mobile subscriber identity of a user end to a visitor end to request a roaming service from the visitor end, as performed by the user end in a request procedure;
generating a second challenge code and sending the first challenge code, the second challenge code and the international mobile subscriber identity to a home end, as performed by the visitor end in an inquiry procedure;
determining whether the international mobile subscriber identity is correct, generating an authentication key and a random code, generating a signature code and a communication key based on the random code and a ciphering key, combining the random code, the signature code and the communication key as an authentication data, generating a response code using the second challenge code, the authentication data, the authentication key and a shared key, and sending the response code to the visitor end, as performed by the home end in a response procedure;
verifying the response code using the shared key, generating an authentication code using the first challenge code and the authentication key, and sending the authentication code and the random code to the user end, as performed by the visitor end in a notification procedure; and
generating another authentication key to determine whether the authentication code is correct, generating an authentication signature code based on the ciphering key and the random code, and sending the authentication signature code to the visitor end for the visitor end to authenticate the user end, as performed by the user end in an authentication procedure.

13. The roaming authentication method for a GSM system as claimed in claim 12, wherein the first challenge code is a numerical number generated in a random manner, a timestamp specifying time information, or a selected number obtained from a series of numbers with even or odd increments or decrements.

14. The roaming authentication method for a GSM system as claimed in claim 12, wherein the second challenge code is a numerical number generated in a random manner, a timestamp specifying time information, or a selected number obtained from a series of numbers with even or odd increments or decrements.

15. The roaming authentication method for a GSM system as claimed in claim 12, further comprising determining whether the second challenge code contained in the response code is consistent with the second challenge code previously transmitted to the home end by the visitor end, as performed by the visitor end in the notification procedure.

16. The roaming authentication method for a GSM system as claimed in claim 12, further comprising generating the authentication key by performing an operation on the first challenge code and the ciphering key, as performed by the home end in the response procedure, wherein the roaming authentication method further comprising generating the another authentication key by performing an operation on the first challenge code and the ciphering key, as performed by the user end in the authentication procedure.

17. The roaming authentication method for a GSM system as claimed in claim 12, further comprising generating the authentication key by performing an operation on the first challenge code and the ciphering key based on a hash function, as performed by the home end in the response procedure, wherein the roaming authentication method further comprises generating the another authentication key by performing an operation on the first challenge code and the ciphering key based on the hash function, as performed by the user end in the authentication procedure.

18. The roaming authentication method for a GSM system as claimed in claim 12, further comprising storing the authentication data and the authentication key in the visitor end in the notification procedure if the second challenge code contained in the response code is consistent with the second challenge code previously transmitted to the home end by the visitor end.

19. The roaming authentication method for a GSM system as claimed in claim 12, further comprising generating the authentication signature code by performing an operation on the ciphering key and the random code based on a first hash function, as performed by the user end in the authentication procedure.

20. The roaming authentication method for a GSM system as claimed in claim 12, further comprising generating the signature code by performing an operation on the random code and the ciphering key based on a first hash function, as performed by the home end in the response procedure.

21. The roaming authentication method for a GSM system as claimed in claim 12, further comprising generating the communication key by performing an operation on the random code and the ciphering key based on a second hash function, as performed by the home end in the response procedure.

22. The roaming authentication method for a GSM system as claimed in claim 12, further comprising selecting the random code from a series of random codes in sequence, as performed by the visitor end in the notification procedure.

23. The roaming authentication method for a GSM system as claimed in claim 12, further comprising generating a secondary signature code and a secondary communication key based on the random code and the ciphering key, and combining the random code, the signature code, the communication key, the secondary signature code and the secondary communication key as the authentication data, as performed by the home end in the response procedure, wherein the roaming authentication method further comprises a re-authentication procedure generating a secondary authentication signature code by performing a remaining number of times of operation on the ciphering key and the random code, and sending the secondary authentication signature code to the visitor end, as performed by the user end when requesting the roaming service from the visitor end again, wherein the roaming authentication method further performs the remaining number of times of operation on the secondary signature code to verify the secondary authentication signature code for the visitor end to authenticate the user end, as performed by the visitor end in the notification procedure, and wherein the remaining number of times is a difference between a predetermined number of times and a number of times that the user end has requested the roaming service from the visitor end.

24. The roaming authentication method for a GSM system as claimed in claim 23, further comprising generating the secondary signature code by performing an operation on the random code and the ciphering key based on a first hash function, as performed by the home end in the response procedure.

25. The roaming authentication method for a GSM system as claimed in claim 23, further comprising generating the secondary communication key by performing an operation on the random code and the ciphering key based on a second hash function, as performed by the home end in the response procedure.

* * * * *